(12) United States Patent
Hagenbuch et al.

(10) Patent No.: US 12,172,842 B2
(45) Date of Patent: Dec. 24, 2024

(54) CARRIER BASKET SUPPORT AND STABILIZING SYSTEM FOR CARRIER BASKET TRANSPORTER

(71) Applicant: Franke Technology and Trademark Ltd, Hergiswil (CH)

(72) Inventors: Alex Hagenbuch, Spring Hill, TN (US); Jeremy Landmark, Murfreesboro, TN (US); Jacob Pawelski, Nashville, TN (US)

(73) Assignee: Franke Technology and Trademark Ltd, Hergiswil (CH)

( * ) Notice: Subject to any disclaimer, the term of this patent is extended or adjusted under 35 U.S.C. 154(b) by 73 days.

(21) Appl. No.: 18/316,355

(22) Filed: May 12, 2023

(65) Prior Publication Data

US 2023/0373725 A1 Nov. 23, 2023

Related U.S. Application Data

(60) Provisional application No. 63/343,697, filed on May 19, 2022.

(51) Int. Cl.
*B65G 17/34* (2006.01)
*B65G 17/12* (2006.01)
*B65G 17/48* (2006.01)

(52) U.S. Cl.
CPC ........... *B65G 17/34* (2013.01); *B65G 17/123* (2013.01); *B65G 17/485* (2013.01); *B65G 2201/0202* (2013.01)

(58) Field of Classification Search
CPC .... B65G 17/34; B65G 17/123; B65G 17/485; B65G 47/48; B65G 2201/0202; B65G 47/57; B65G 35/00
See application file for complete search history.

(56) References Cited

U.S. PATENT DOCUMENTS

| | | | | |
|---|---|---|---|---|
| 3,847,272 A | * | 11/1974 | Anikanov | B65G 17/48 198/801 |
| 4,015,537 A | * | 4/1977 | Graef | B61C 13/04 238/148 |
| 4,411,336 A | * | 10/1983 | Anders | B61B 13/12 186/28 |

(Continued)

FOREIGN PATENT DOCUMENTS

| | | |
|---|---|---|
| CN | 110482098 | 11/2019 |
| KR | 102170663 | 10/2020 |

*Primary Examiner* — Mark A Deuble
(74) *Attorney, Agent, or Firm* — Volpe Koenig

(57) ABSTRACT

A carrier basket support and stabilizing system having cars configured to travel along a pathway, at least some support groups including three of the cars, and each support group of three of the cars includes a lead, center, and trailing car, and a carrier basket support is connected to the center car. The carrier basket support includes a center plate and a support post connected to the center car and first and second wing plates located on opposite sides of and pivotally connected to the center plate. The lead and trailing cars slidably support the respective wing plates there-against as the cars pivot while moving along the pathway. A carrier basket is pivotally connected to the support post and has rollers configured for rolling contact with the center, first, and/or the second wing plates, depending on an orientation of the carrier basket support.

14 Claims, 25 Drawing Sheets

(56) References Cited

U.S. PATENT DOCUMENTS

| | | | | |
|---|---|---|---|---|
| 4,957,188 | A | * | 9/1990 | Bavis ..................... B65G 21/22 186/14 |
| 4,989,722 | A | * | 2/1991 | Kuepper ................ B65H 67/06 198/476.1 |
| 5,050,726 | A | * | 9/1991 | Flagg ................... B65G 17/123 198/799 |
| 5,372,072 | A | * | 12/1994 | Hamy ..................... B61C 13/04 105/154 |
| 6,533,106 | B1 | * | 3/2003 | Lykkegaard ......... B65G 17/123 198/798 |
| 7,708,135 | B2 | | 5/2010 | Ellerth et al. |
| 8,770,385 | B2 | * | 7/2014 | Hannessen ............ B65G 47/57 198/607 |
| 2002/0104713 | A1 | * | 8/2002 | Brown ................. B65G 17/123 198/701 |
| 2021/0094761 | A1 | | 4/2021 | Czapp et al. |
| 2024/0083683 | A1 | * | 3/2024 | Czapp ................... B65G 17/123 |
| 2024/0132288 | A1 | * | 4/2024 | Sung .................... B65G 17/123 |

\* cited by examiner

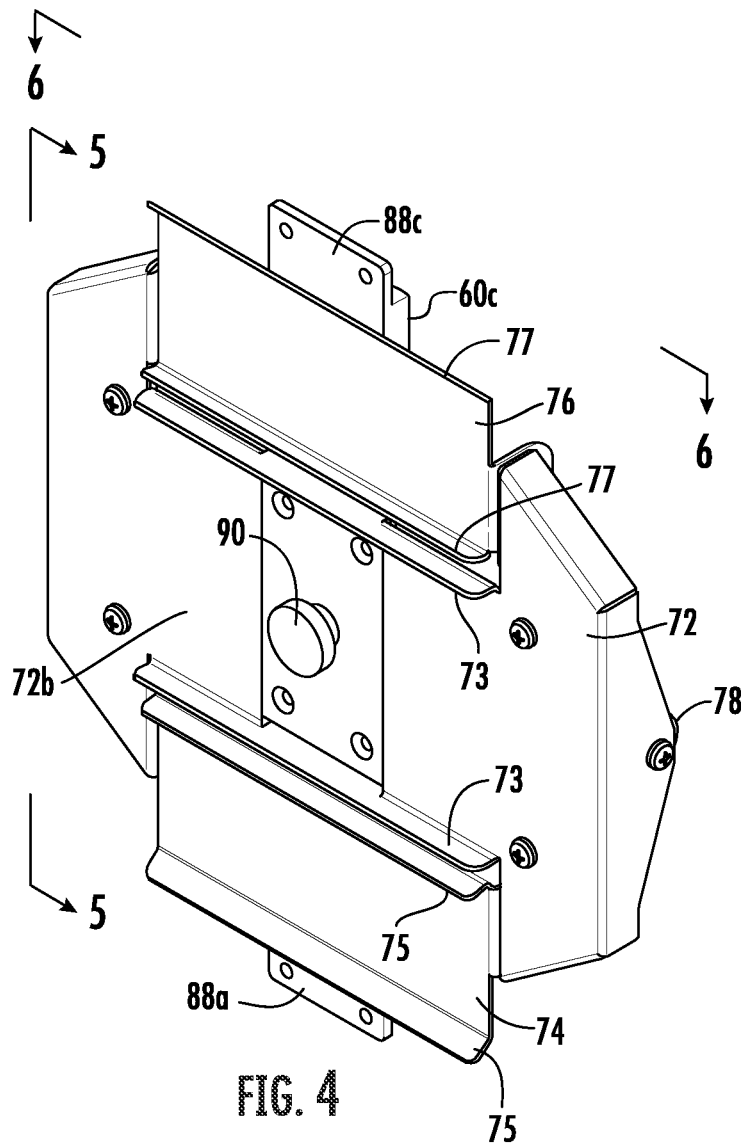
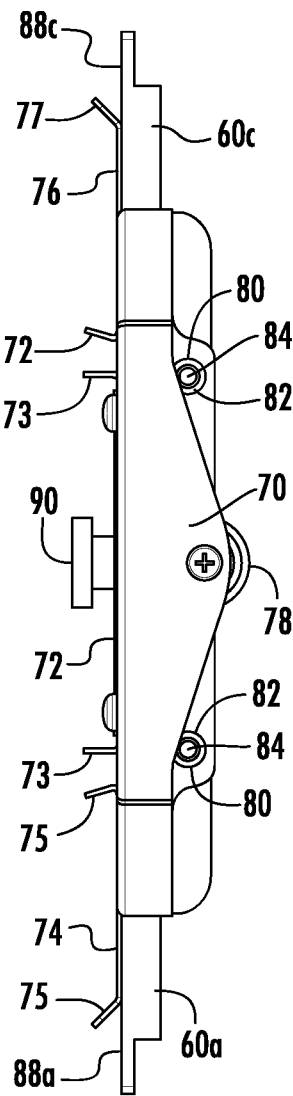
FIG. 4
FIG. 5
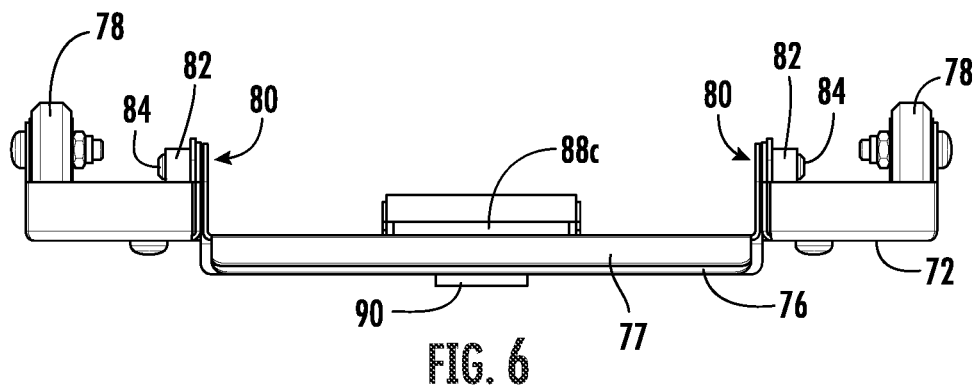
FIG. 6

CARRIER BASKET SUPPORT AND STABILIZING SYSTEM FOR CARRIER BASKET TRANSPORTER

CROSS-REFERENCE TO RELATED APPLICATIONS

This application claims the benefit of U.S. Provisional Patent Application No. 63/343,697, filed May 19, 2022, which is incorporated herein by reference as if fully set forth.

TECHNICAL FIELD

The present invention relates to the field of conveyor systems for use in moving products, such as delivery of orders in chain restaurants, bars, cafeterias, or the like. More particularly, the invention relates to a system for supporting and stabilizing the carrier basket as it is moved along by the conveyor between the loading and/or unloading stations.

BACKGROUND

Applicant has developed and markets an overhead conveyor system which is based on a continuous track made up into a closed loop that contains an endless "train" of small wheeled cars connected together. The track is normally suspended from the ceiling or wall and can be made to snake through a building from a loading point to an unloading point and back again. Food products to be transported need to be in packages or bags, which are placed in carrier baskets carried by some of the wheeled cars. Various means may be provided to unload or release the packages or bags from the carrier basket and the food placed into a holding tray.

Another food transport system for the vertical transport of packaged food items from one floor of a restaurant to another floor is described in U.S. Pat. No. 7,708,135. The food transport system includes a conveyor that transports food-item supporting carriers along a closed-loop pathway defined by a belt or chain, to which the carriers are pivotably connected. Although the transport of food items placed on supporting carriers is convenient, the belt or chain-based conveyor system is much less flexible in terms of space utilization and winding transport pathways.

US 2021/0094761 of the Applicant is also directed to a conveyor system for the transport of packaged food items in restaurants, etc., which allows a flexible design of layouts. This provides a track-based conveyor system with supporting carriers on which food items to be transported can be placed at a loading station. The food items are then transported to a customer delivery point which is remote from the loading station. Here, the packaged items are loaded onto the carriers at loading and unloading stations. In one preferred arrangement, the carriers are defined by baskets (carrier baskets) having a series of support fingers cantilevered from a single back support that is pivotally mounted to a car that can travel in a conveyor track. The carrier support fingers are aligned with spaces located between loading/unloading station support fingers or rollers. The entire content of US 2021/0094761 is incorporated herein by reference as if fully set forth.

Although the know arrangements have been successful in operation, there is an issue with supporting the carrier basket when loaded since the weight of the items being transported is offset from the back support in a cantilevered manner, causing tilting of the carrier basket. Discrete bumpers have been used on the back support to transfer the load to the car and or conveyor track, or to an additional support rail that runs beneath the conveyor track. However, improved functionality, particularly at turns in the track, is desired.

SUMMARY

The present disclosure is directed to a carrier basket support and stabilizing system for a carrier basket transporter including a conveyor system having a pathway. The system includes a plurality of cars configured to travel along the pathway, at least some support groups including three of the cars, and each said support group of three of the cars includes a lead car, a center car, and a trailing car that are connected in series via pivoting connections, and a carrier basket support is connected to the center car. While three of the cars are preferred, groups of three or more cars are possible, and reference to a group of three cars herein includes at least the leading, center, and trailing cars, and could have other interspersed cars. The carrier basket support includes a center plate fixedly connected to the center car as well as first and second wing plates located on opposite sides of and pivotally connected to the center plate. The first and second wing plates are preferably formed of or include a ferromagnetic material, preferably on a pathway side thereof. Additionally, a support post is provided, preferably connected to the center plate, and is configured for connection to a carrier basket on a side facing away from the pathway. In one preferred embodiment, the lead car includes a first magnet for slidably retaining the first wing plate there-against as the lead car pivots relative to the center car as the cars move along the pathway, and the trailing car includes a second magnet for slidably retaining the second wing plate there-against as the trailing car pivots relative to the center car as the cars move along the pathway. However, these first and second magnets are optional, and it is possible to bias the first and second wing plates against the respective lead and trailing cars using torsion springs, or to allow the first and second wing plates to pivot freely and be pressed in position by contact with the carrier basket.

In a preferred embodiment, a carrier basket is provided including a back support and a product support surface extending generally transversely from the back support in a direction opposite to the pathway. A pivot connection is provided on the back support that is connected or connectable to the support post. Low friction contact elements are connected to the back support and are configured for low friction moving contact with at least one of the center plate, the first wing plate, or the second wing plate, depending on an orientation of the carrier basket support as the carrier basket support is moved by the support group of cars along the pathway. The low friction contact elements can be rollers or a low friction slide block, preferably made from a polymeric material.

In one preferred arrangement, a first sliding contact plate may be located on the lead car and a second sliding contact plate may be located on the trailing car, and the first and second wing plates are in sliding contact with the respective first and second sliding contact plates. Preferably, the first and second magnets are recessed beneath respective sliding contact surfaces of the respective first and second sliding contact plates.

In a preferred arrangement, the pathway includes curved portions horizontal curved portions (curves extending in the X-Z plane) and vertical curved portions (curves extending in the X-Y plane), and the lead and trailing cars are configured to pivot relative to the center car as the support group of cars travels around the curved portions. For horizontal curved portions, the first and second wing plates are configured to pivot relative to the center plate while preferably being maintained in contact with the lead and trailing cars by the respective first and second magnets or springs. For the vertical curved portions, the sliding contact with the leading and trailing cars, preferably via the first and second magnets or springs allows the wing plates to maintain their generally in-plane position relative to the center car as the leading and trailing cars pivot relative to the center car.

In one preferred arrangement where the rollers are provided, the rollers may be rotatably mounted in openings in the back support in a position below the pivot connection.

In one preferred embodiment, the product support surface may comprise a plurality of spaced apart fingers.

In one preferred embodiment, the cars may include track rollers that are configured to ride on a track that defines the pathway.

In a preferred arrangement, each said car may be connected to an adjacent one of said cars by a ball and socket connection. This provides for pivoting in multiple directions in order to allow the cars to follow the pathway. Alternatively, a universal joint or other type of pivotable connection can be used.

In one preferred embodiment, support rollers may be affixed to opposite sides of the center plate that are aligned for rolling in a direction of the pathway. These can be used in connection with an optional additional guide rail that is located below the pathway in order to stabilize the carrier basket support during movement along at least a portion of the pathway.

In one preferred embodiment, the first and second wing plates may be each connected to the center plate by two pivot bearings.

Using one or more of the above features in connection with the basic system provides enhanced performance by maintaining the carrier basket alignment and reducing the potential for shifting of the products carried thereon, including for heavy products, as the carrier basket travels along the pathway defined by the conveyor system.

Further the arrangement of the center plate and the first and second wing plates provides a solid support surface against which the rollers connected to the back support can roll throughout 360 degrees of travel in order to be able to transmit cantilevered loads on the basket to the carrier basket support. This support surface is generally co-planar except in the areas of the horizontal (X-Z) curves.

This system is unique in that it allows for a roller contact surface over which the rollers can travel during periods of basket transition, but it also allows this support surface formed by the center plate and the first and second wing plates to conform to the profile of the track when traversing through inside 90 degree and outside 90 degree corners, during which time carrier basket support by the wing plates is not required.

BRIEF DESCRIPTION OF THE DRAWINGS

Further advantages and characteristics of the invention will become apparent by the below description of embodiments making reference to the accompanying drawings, in which:

FIG. 4 is a perspective view of the carrier basket support used with the carrier basket support and stabilizing system shown in FIG. 2.

FIG. 5 is a side elevational view of the carrier basket support shown in FIG. 4, taken along the lines 5-5 in FIG. 4.

FIG. 6 is a top view of the carrier basket support shown in FIG. 4 taken along lines 6-6 in FIG. 4.

DETAILED DESCRIPTION

Figure 1:
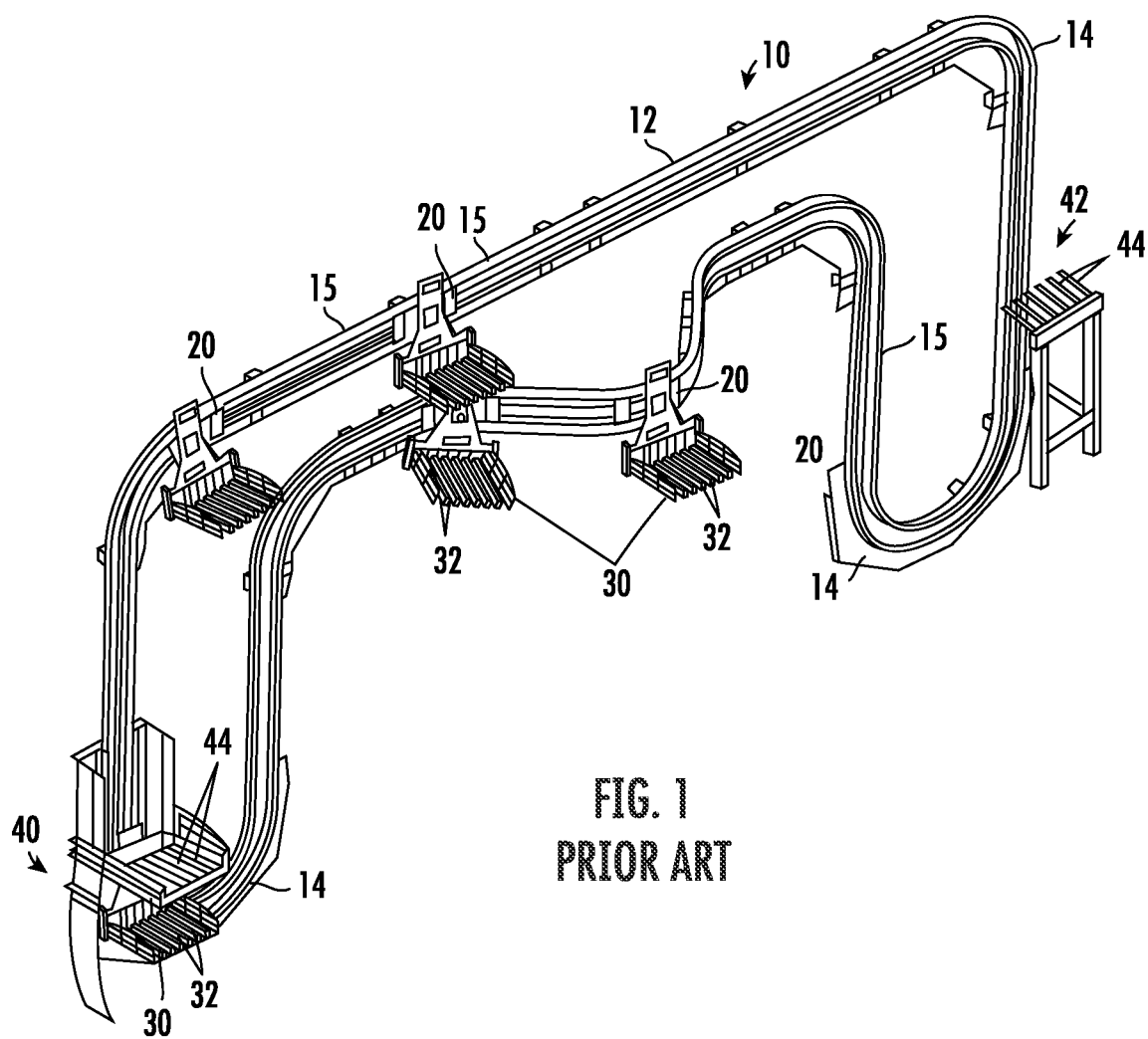
FIG. 1 is a perspective view of a prior art conveyor system of the Applicant that uses carrier baskets that are carried along a pathway defined by a track having cars that travel along the track.
Figure 2:
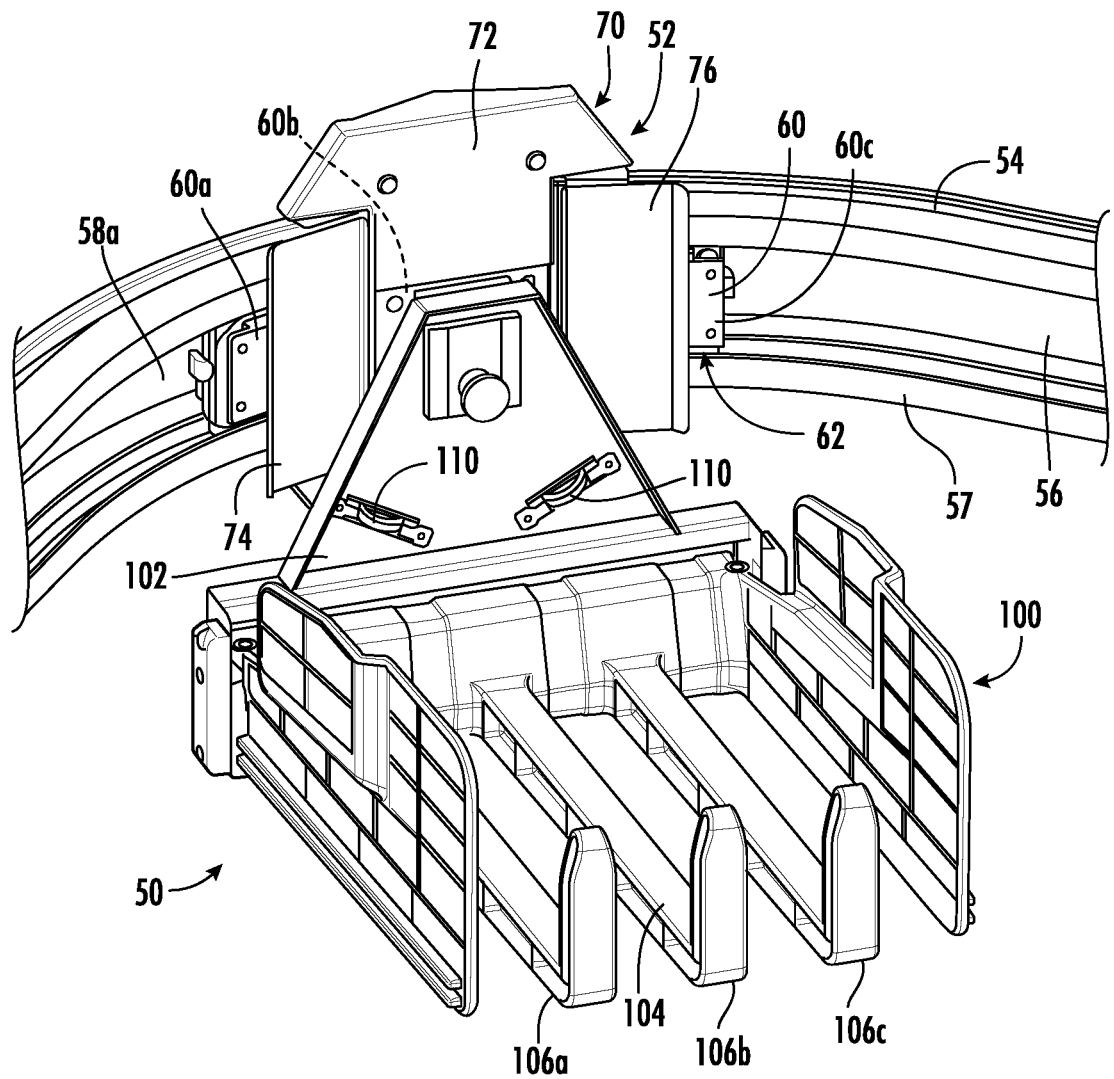
FIG. 2 is a perspective view of a portion of a carrier basket support and stabilizing system for a carrier basket transporter including a conveyor system having a pathway, similar to the conveyor system shown in FIG. 1, illustrated at a curved portion of the pathway.
Figure 3:
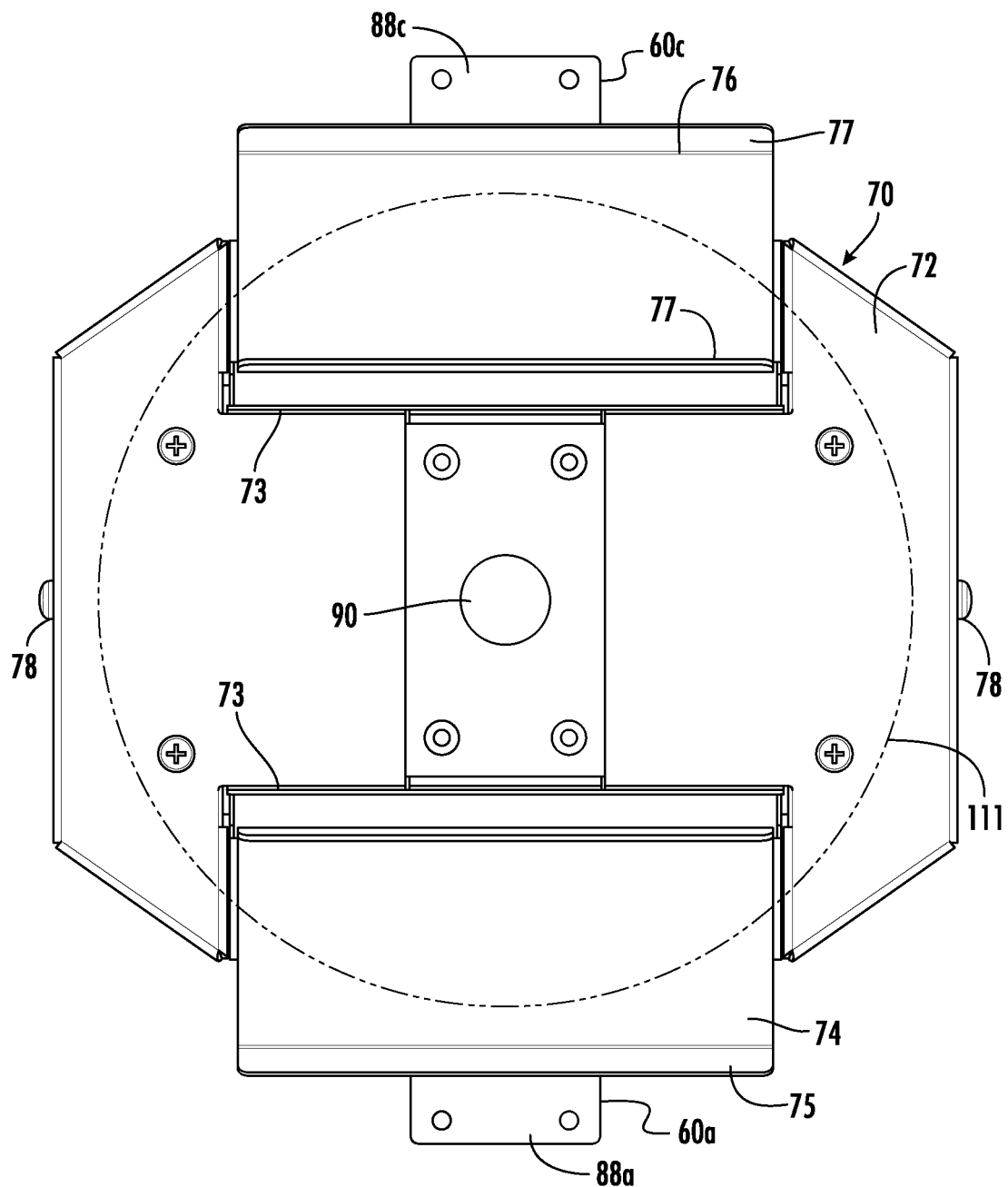
FIG. 3 is an elevational view of a front of the carrier basket support used for the carrier basket support and stabilizing system shown in FIG. 2.
Figure 7:
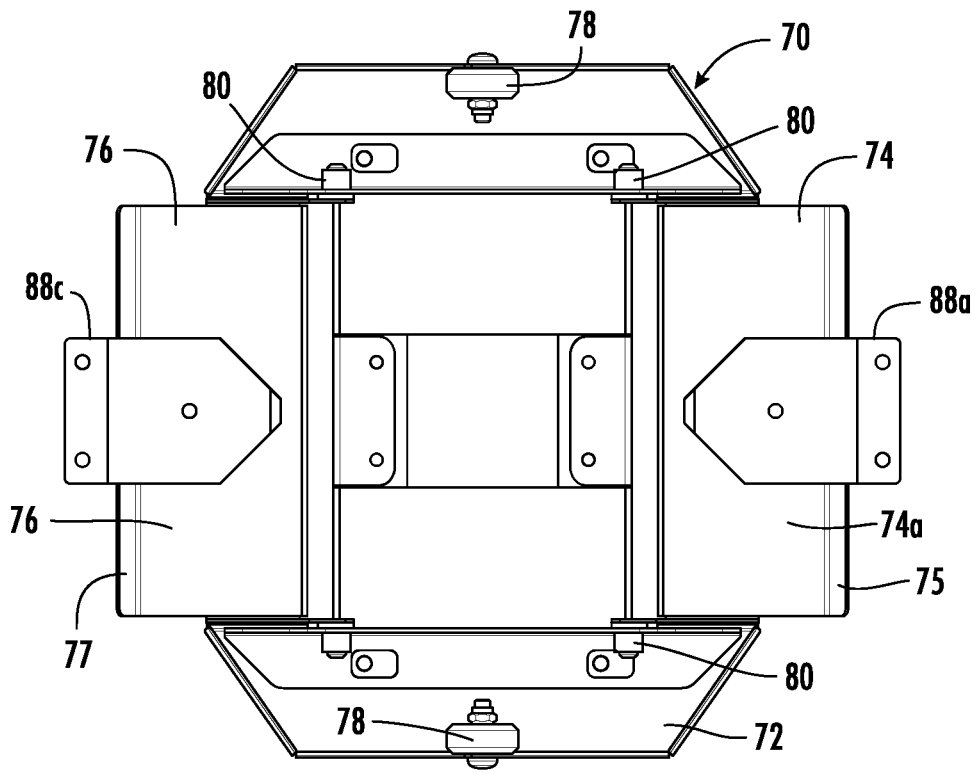
FIG. 7 is a rear elevational view of the carrier basket support shown in FIGS. 3-6.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. The terms approximately or generally mean within +/−10% of a specified value unless otherwise noted, and within +/−25° of a specified angle or direction.

FIG. 1 is a view showing an embodiment of Applicant's conveyor system 10 from U.S. 2021/0094761, which is incorporated herein by reference as if fully set forth. This includes a pathway 12 defined by a track 13 having one or more curved portions 14 as well as straight segments 15 in which a plurality of cars 20 are guided. A motor drives the cars 20 along the track 13 either via having the cars 20 directly linked to one another or having intermediate portions located between the cars 20. A carrier basket 30 is pivotally mounted to at least some of the cars, with the carrier basket 30 including carrier support fingers 32 that are cantilevered from the side of the carrier basket 30 that is pivotally mounted to the cars 20. At least one of a loading station 40 or an unloading station 42 is preferably located along the pathway 12. The loading and unloading stations 40, 42 include support fingers 44 that are used to remove an item being transported from the carrier basket 30 by the carrier basket support fingers 32 moving between the loading or unloading station support fingers 44 to either pick-up or drop-off the item being transported via the conveyor system 10. These support fingers 44 can be powered, i.e., formed by powered rollers, belts or chains, in order to further carry the item along a transport or delivery path. As discussed in U.S. 2021/0094761, the conveyor system 10 allows enhanced flexibility for the design of layouts in order to suit particular applications and space requirements.

Referring to FIGS. 2-18, an embodiment of a carrier basket support and stabilizing system 50 in accordance with the present disclosure is shown. The carrier basket support and stabilizing system 50 is for use in connection with a carrier basket transporter 52 that includes a conveyor system 54, similar to the conveyor system 10 disclosed in FIG. 1, that has a pathway 56 along which the carrier baskets 100 are carried. The pathway 56 is defined by tracks 57, similar to the track 13 discussed above, that can be arranged in various configurations having curved portions as well as straight segments in order to move products, which can be for example fast food, that is placed in the carrier basket 100, preferably between loading and unloading stations, such as 40 and 42 shown in FIG. 1.

The system 50 includes a plurality of cars 60, shown in FIGS. 2 and 8-12, that are configured to travel along the pathway 56. At least some support groups 62 include three of the cars 60. While three of the cars are preferred, support groups 62 may include three or more cars 60. Each of the support groups 62, shown best in FIGS. 11 and 12, include a lead car 60a, a center car 60b, and a trailing car 60c that are connected in series via pivoting connections 64, and a carrier basket support 70 is connected to the center car 60b. These pivoting connections 64 preferably include a ball 65 that extends from one of the cars 60 that engages in a socket 66 in the adjacent car 60 in order to provide a ball and socket connection. However, other types of connections can be used. Additionally, the cars, 60 preferably include track rollers 61 that are configured to ride on the track 57 that defines the pathway 56. These track rollers 61 may be provided on both sides of each car 60 as well as on a bottom of each car 60 that faces the inside of the track 57. Reference to a support group 62 of three cars 60 herein includes at least the leading, center, and trailing cars 60a, 60b, 60c, and could have other interspersed cars Referring now to FIGS. 2-12, the system 50 includes at least one carrier basket support 70 that is connected to the center car 60b in a group 62 of three of the cars 60, and the system 50 may include several of the carrier basket supports 70 connected to the center car 60b in respective groups 62 of the cars 60, depending upon the specific system requirements.

Each carrier basket support 70 includes a center plate 72 that is fixedly connected to the center car 60b. This can be done with screws or via other connector means. First and second wing plates 74, 76 are located on opposite sides of and are pivotally connected to the center plate 72. These wing plates 74, 76 may have flanges 75, 77 along one or both sides for stiffening. Additionally, the center plate 72 may also be provided flanges 73 for stiffening in an area where the wing plates 74, 76 are mounted. The flanges 75, 77 also act as a limit stop for pivoting movement of the first and second wing plates 74, 76 based on their size and spacing from the adjacent flanges 73 on the center plate 72. The pivotal connections are formed via pivot bearings 80 that include bushings 82 mounted to the center plate 72 and pivot posts 84 that extend from opposite sides of the first and second wing plates 74, 76 in the pivot connection area. While pivot bearings 80 are preferred, other types of pivot connections can be used. The first and second wing plates 74, 76 are formed of or include a ferromagnetic material, preferably at least on a pathway side 74a, 76a thereof.

As shown in detail in FIGS. 4 and 5, a support post 90 that is configured for connection to a carrier basket 100 is provided on a side 72b of the center plate 72 that faces away from the pathway 56. The center post 90 may include an enlarged end that is adapted to be received in a pivot connection 108, preferably in the form of key hole-type receptacle, shown in FIG. 14, on the back support 102 of the carrier basket 100.

Figure 8:
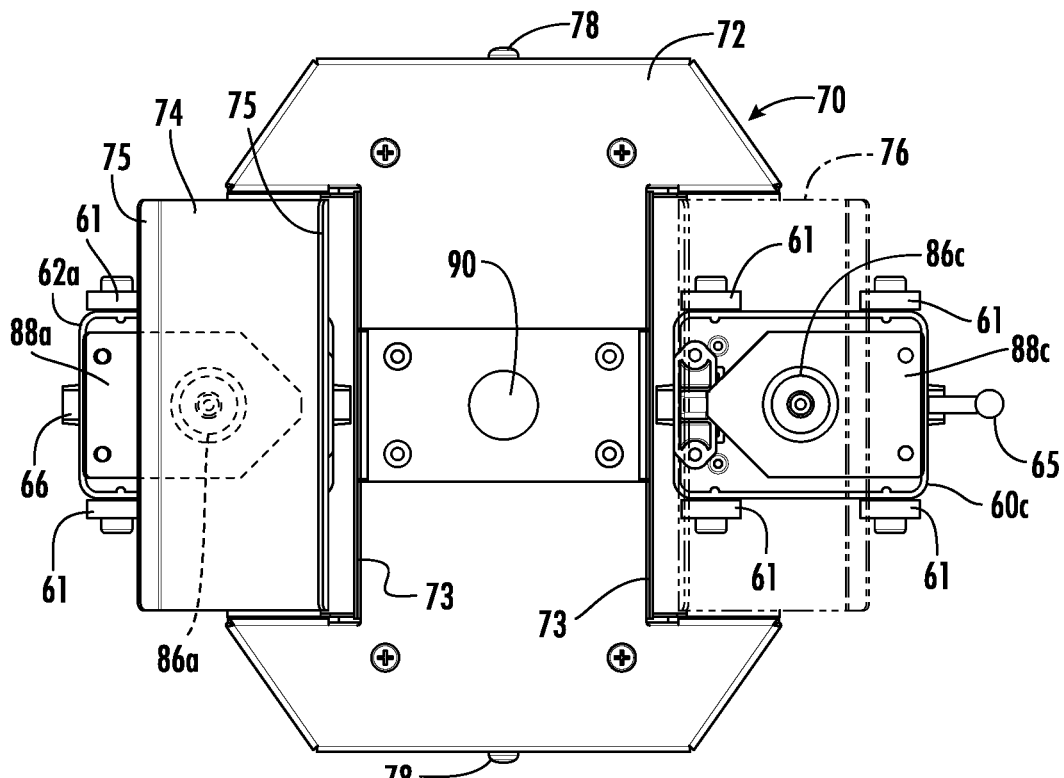
FIG. 8 is a front elevational view similar to FIG. 3 shown with one of the wing plates in phantom lines so that the car supporting the wing plate can be seen in detail.
Figure 9:
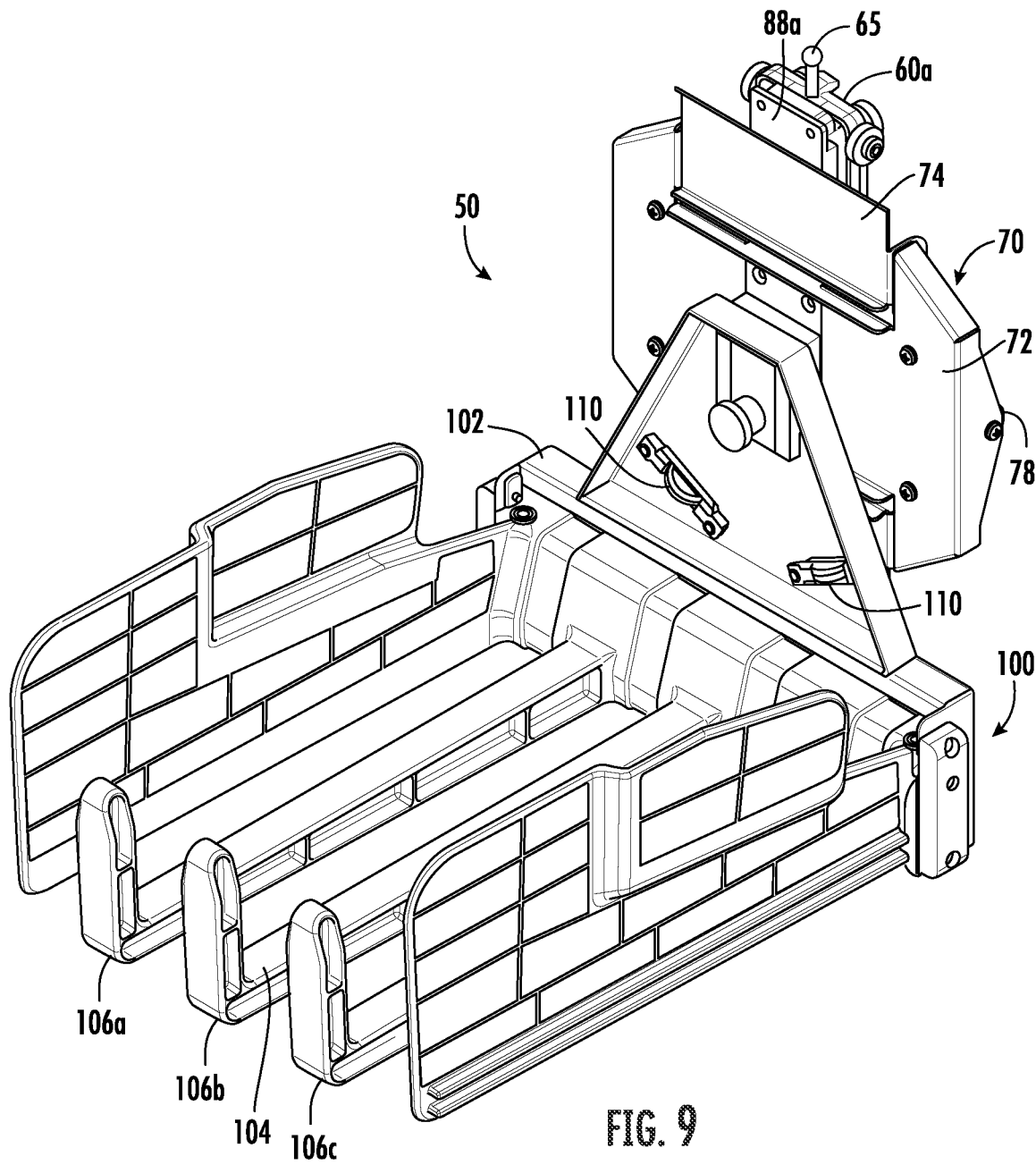
FIG. 9 is a perspective view showing the assembly of the carrier basket support with a carrier basket.
Figure 10:
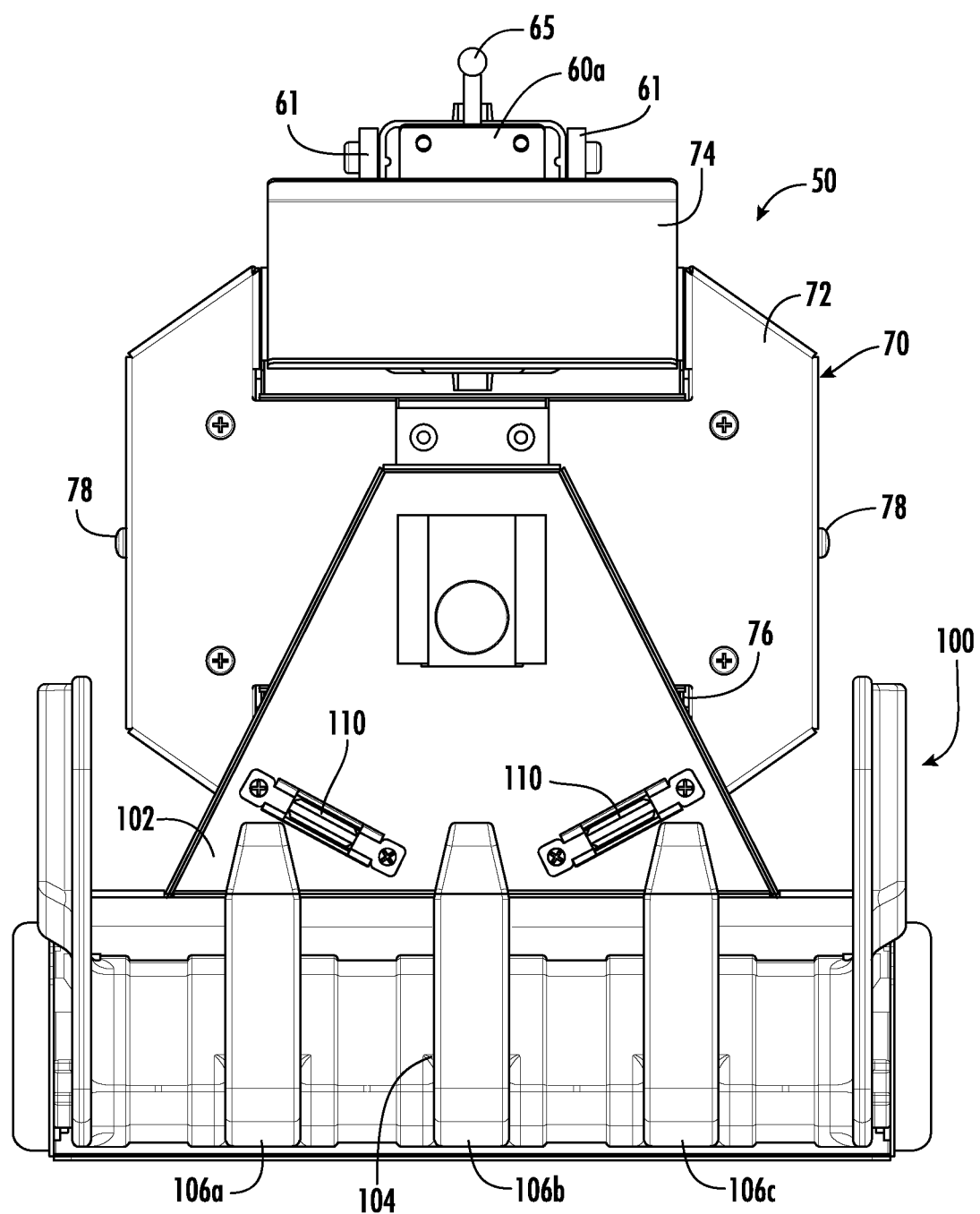
FIG. 10 is a front elevational view of the assembly shown in FIG. 9.
Figure 11:
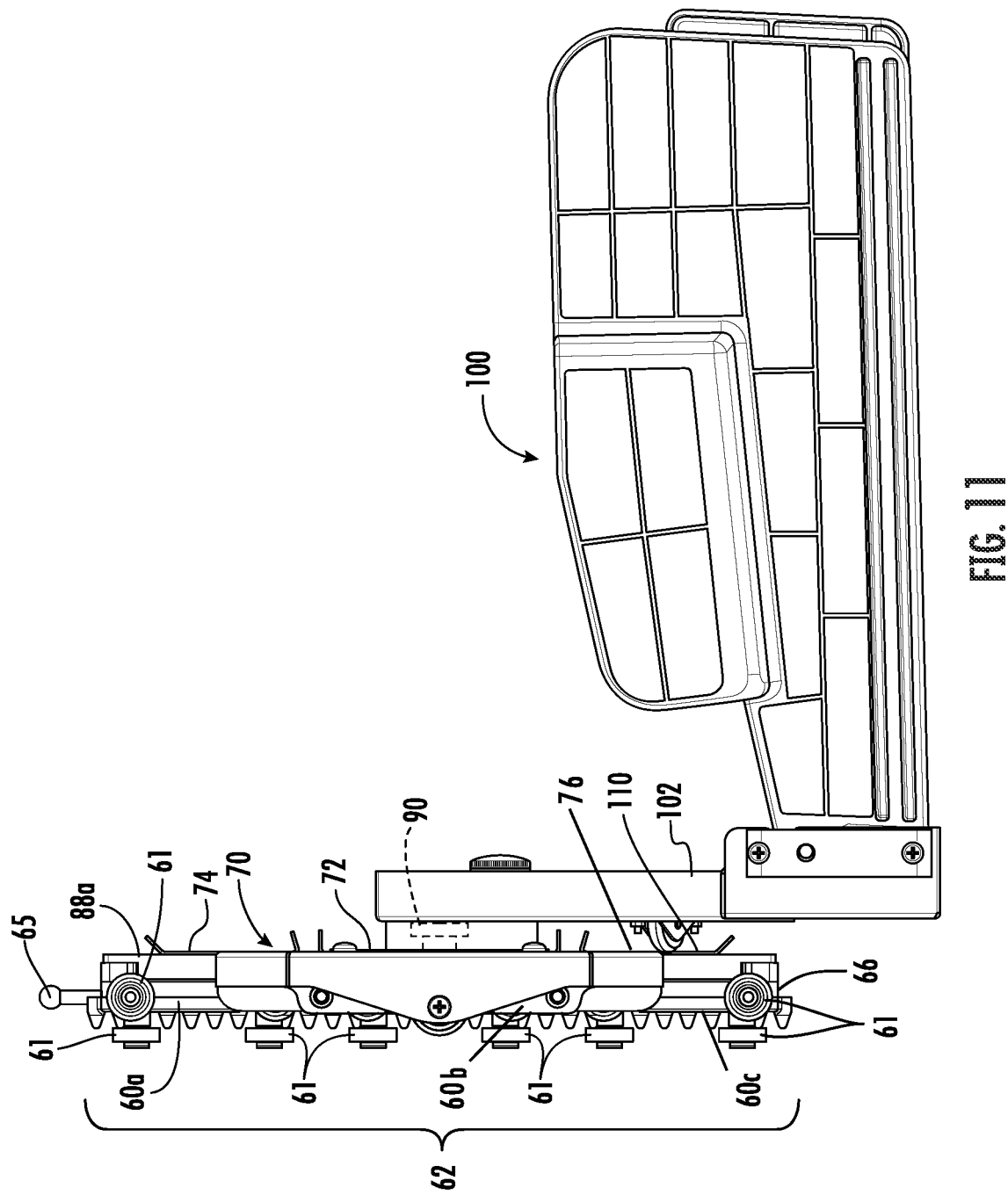
FIG. 11 is a left side elevational view of the assembly shown in FIGS. 9 and 10.
Figure 12:
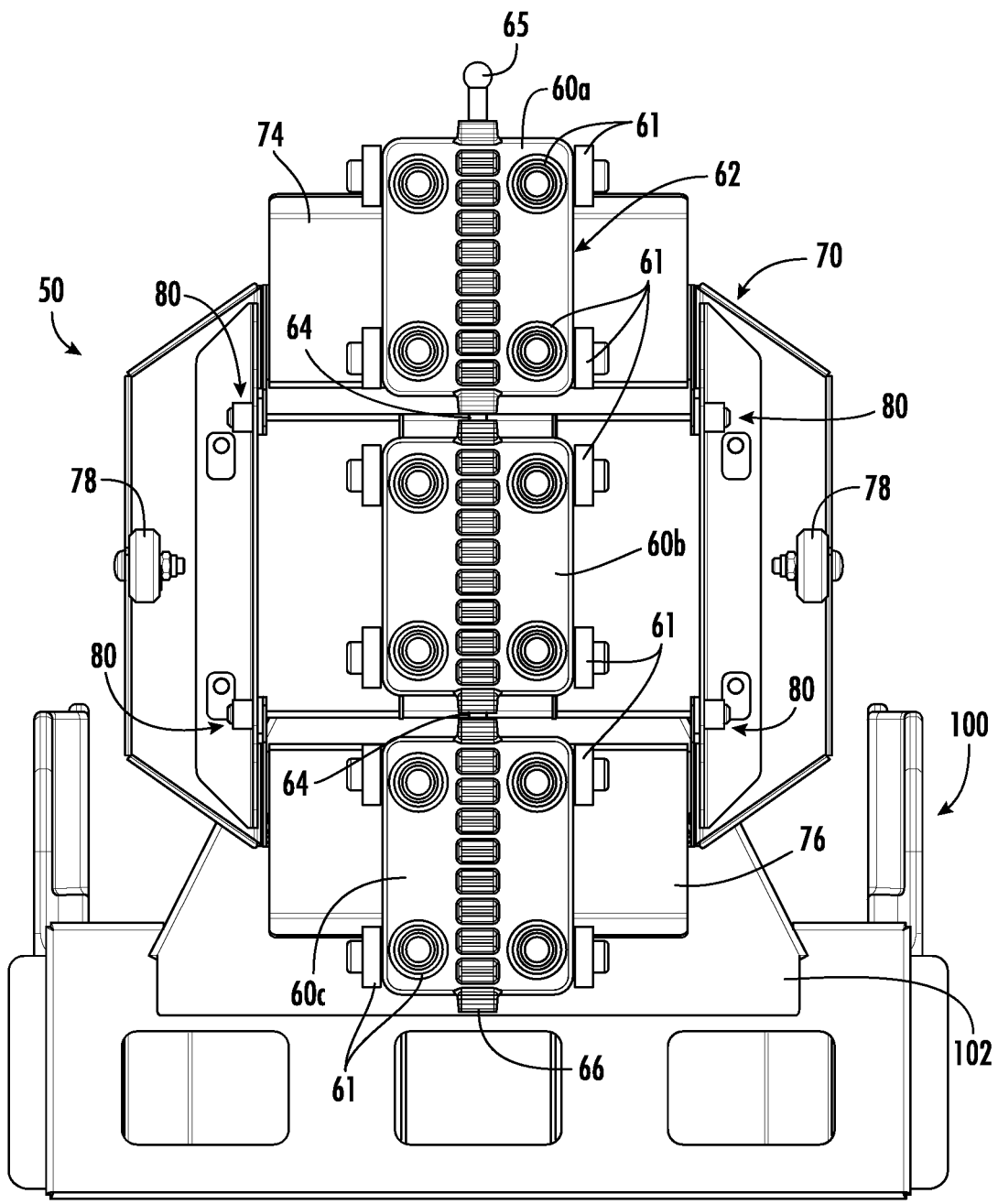
FIG. 12 is a rear elevational view of the assembly shown in FIG. 9.
Figure 13:
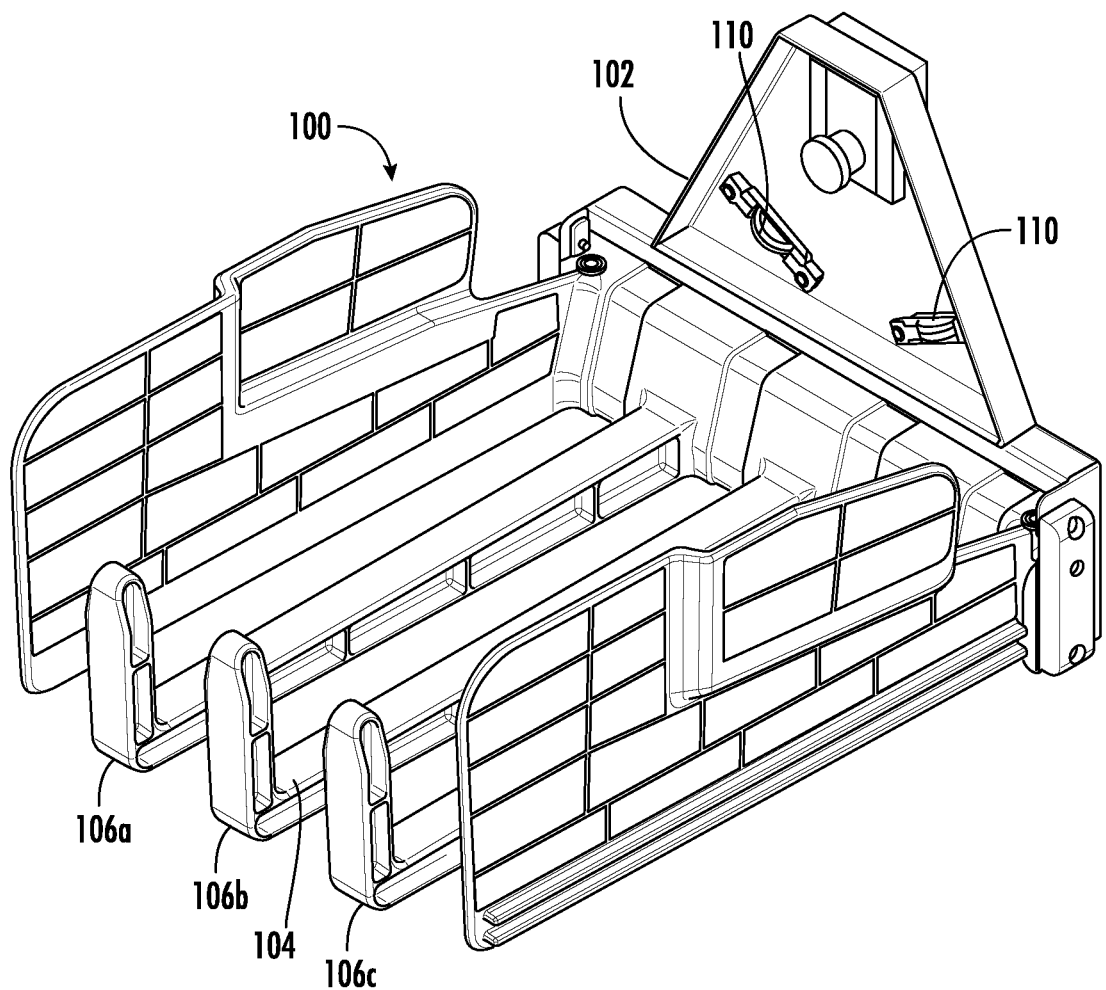
FIG. 13 is a front perspective view of the carrier basket shown alone.
Figure 29:
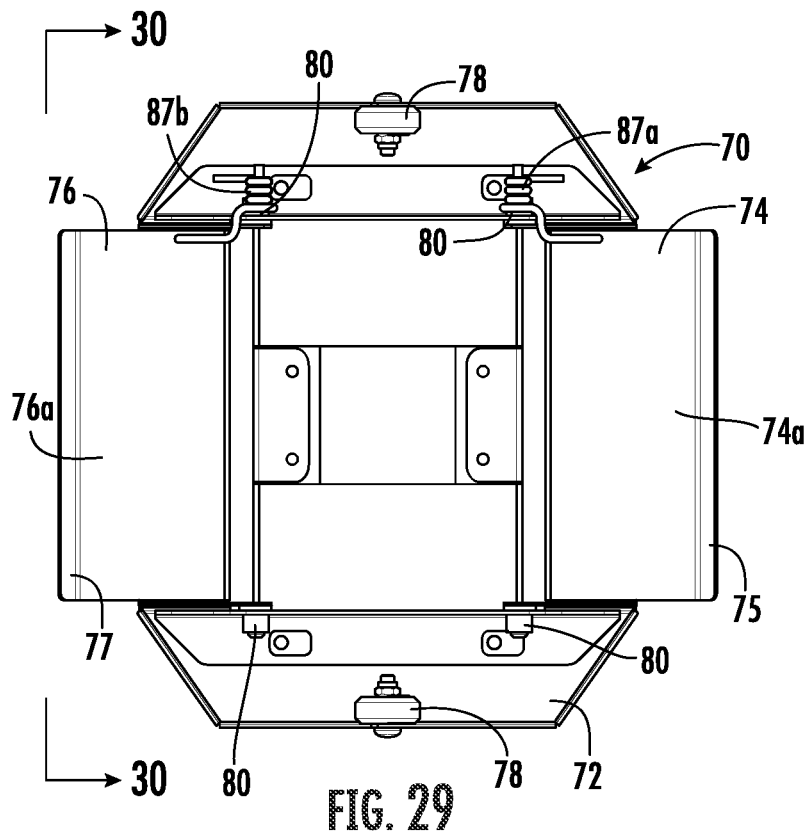
FIG. 29 is a rear elevational view of an alternate embodiment of the carrier basket support having springs that bias the first and second wing plates toward the cars.
Figure 30:
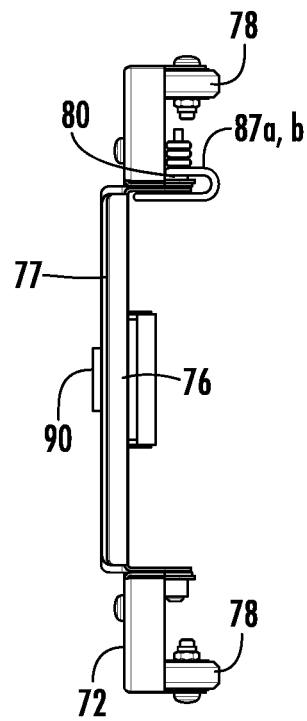
FIG. 30 is a view similar to FIG. 6 taken along line 30-30 in FIG. 29.

Referring to FIG. 8, in one preferred embodiment the lead car 60a includes a first magnet 86a for slidably retaining the first wing plate 74 there-against as the lead car 60a pivots relative to the center car 60b as the cars 60 move along the pathway 56. Additionally, the trailing car 60c also includes a second magnet 86c for slidably retaining the second wing plate 76 there-against as the trailing car 60c pivots relative to the center car 60*b* as the cars 60 move along the pathway 56. This arrangement allows for sliding contact between the first and second wing plate 74, 76 and the lead and trailing car 60*a*, 60*c* which is specifically advantageous in allowing the car group 62 with the carrier basket support 70 to traverse horizontal inside and outside corners along the pathway 56, while still providing a carrier basket support 70 that will function as required along other portions of the pathway 56, as discussed herein. Alternatively, instead of using the magnets 86*a*, 86*b*, the first and second wing plates 74, 76 can be biased against the respective lead and trailing cars 60*a*, 60*c* using torsion springs 87*a*, 87*b*, shown in FIGS. 29 and 30, or other types of springs. As a further alternative, the first and second wing plates 74, 76 can be allowed to pivot freely, with the outward pivoting movement limited by the flanges 75, 77 and be pressed in position by contact with the carrier basket 100, Referring to FIGS. 2 and 9-18, the system 50 preferably also includes a carrier basket 100 that is connectable or connected to the support post 90 on the carrier basket support 70. Depending on the system configuration and the number of carrier basket support 70 provided, a corresponding number of the carrier baskets 100 may be provided.

Figure 14:
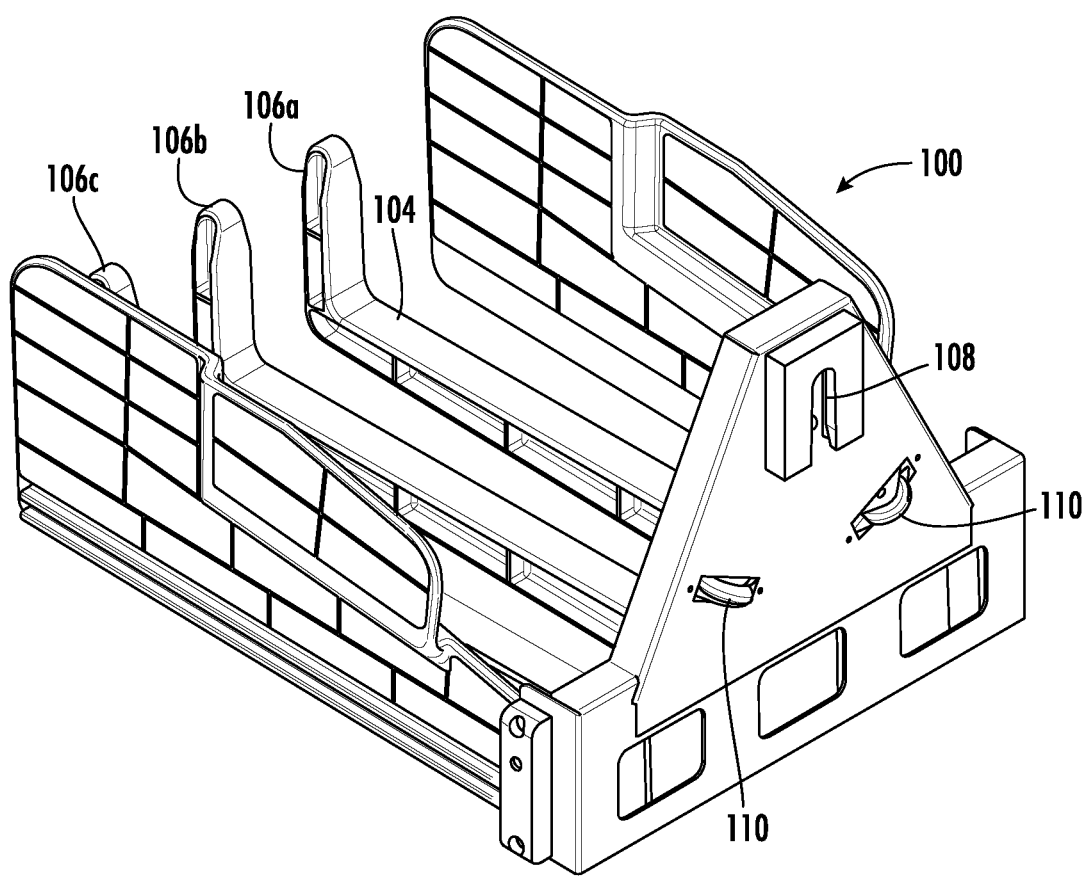
FIG. 14 is a rear perspective view of the carrier basket shown alone.
Figure 15:
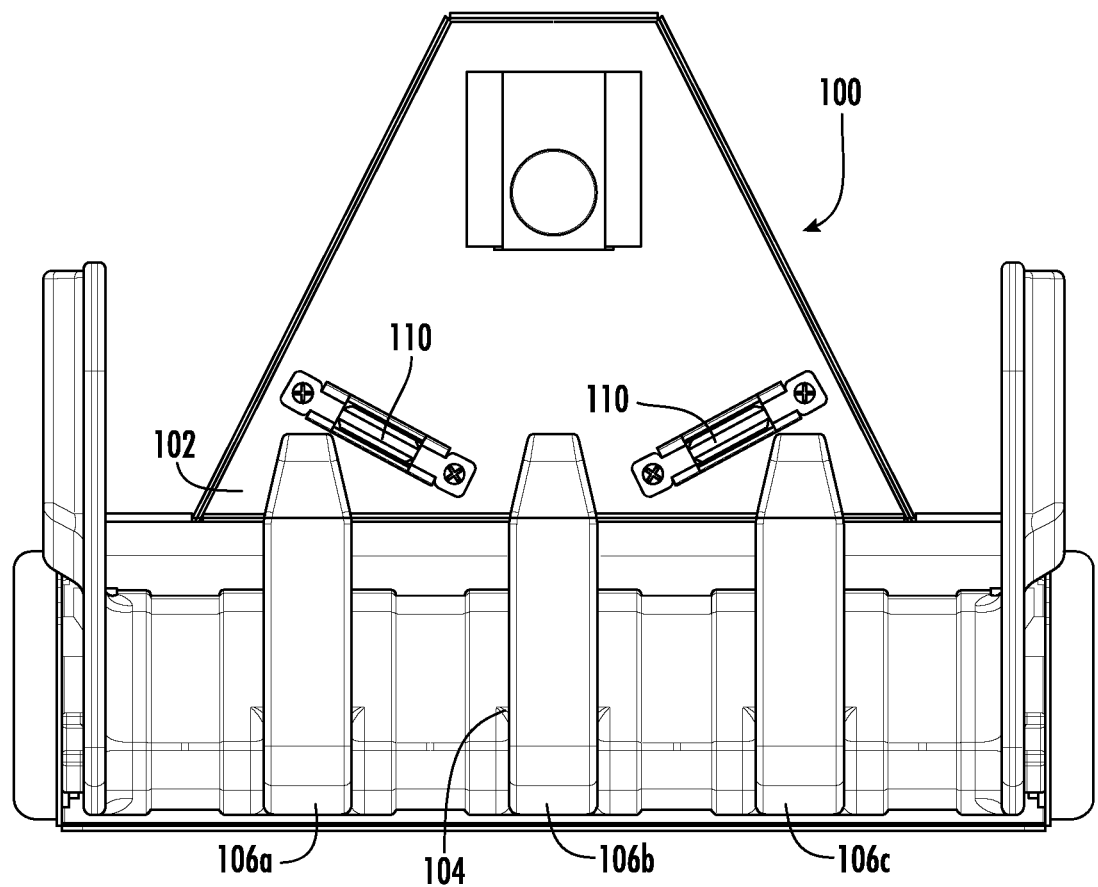
FIG. 15 is a front elevational view of the carrier basket shown alone.
Figure 16:
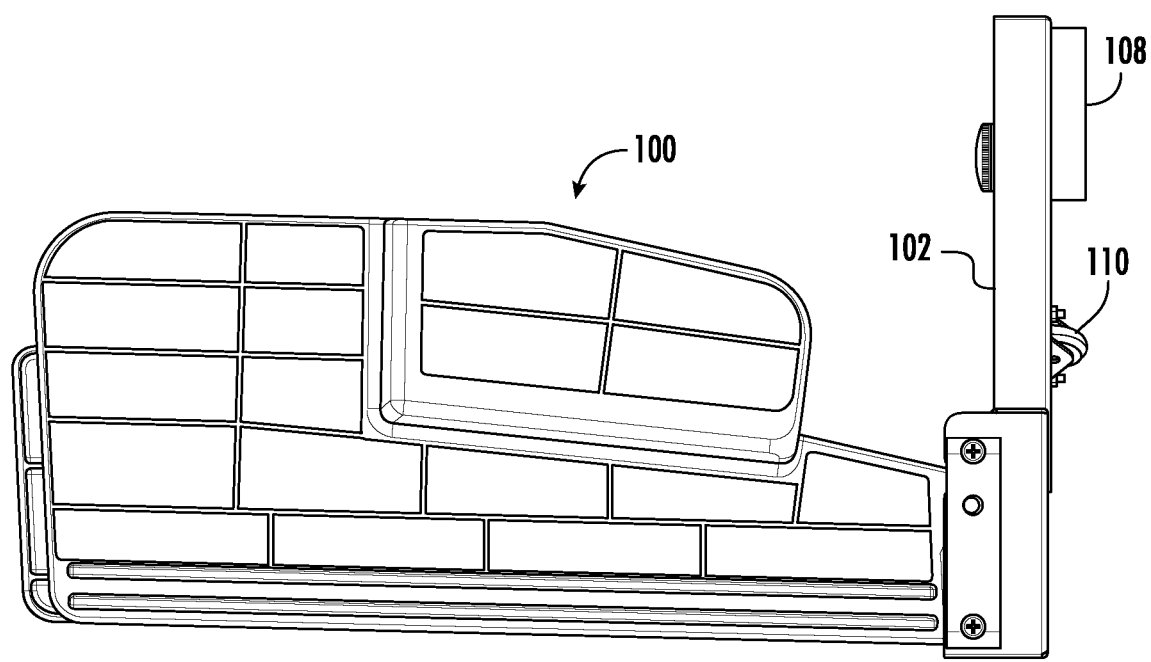
FIG. 16 is a right side elevational view of the carrier basket shown alone.
Figure 17:
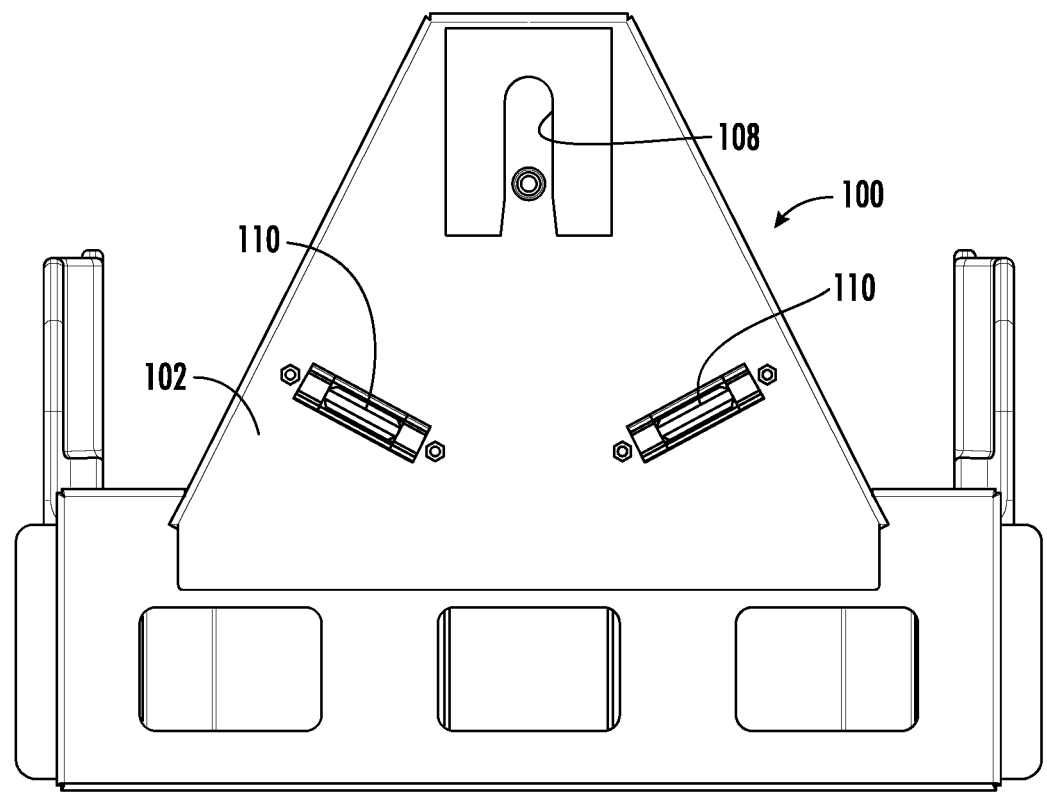
FIG. 17 is a rear elevational view of the carrier basket shown alone.
Figure 18:
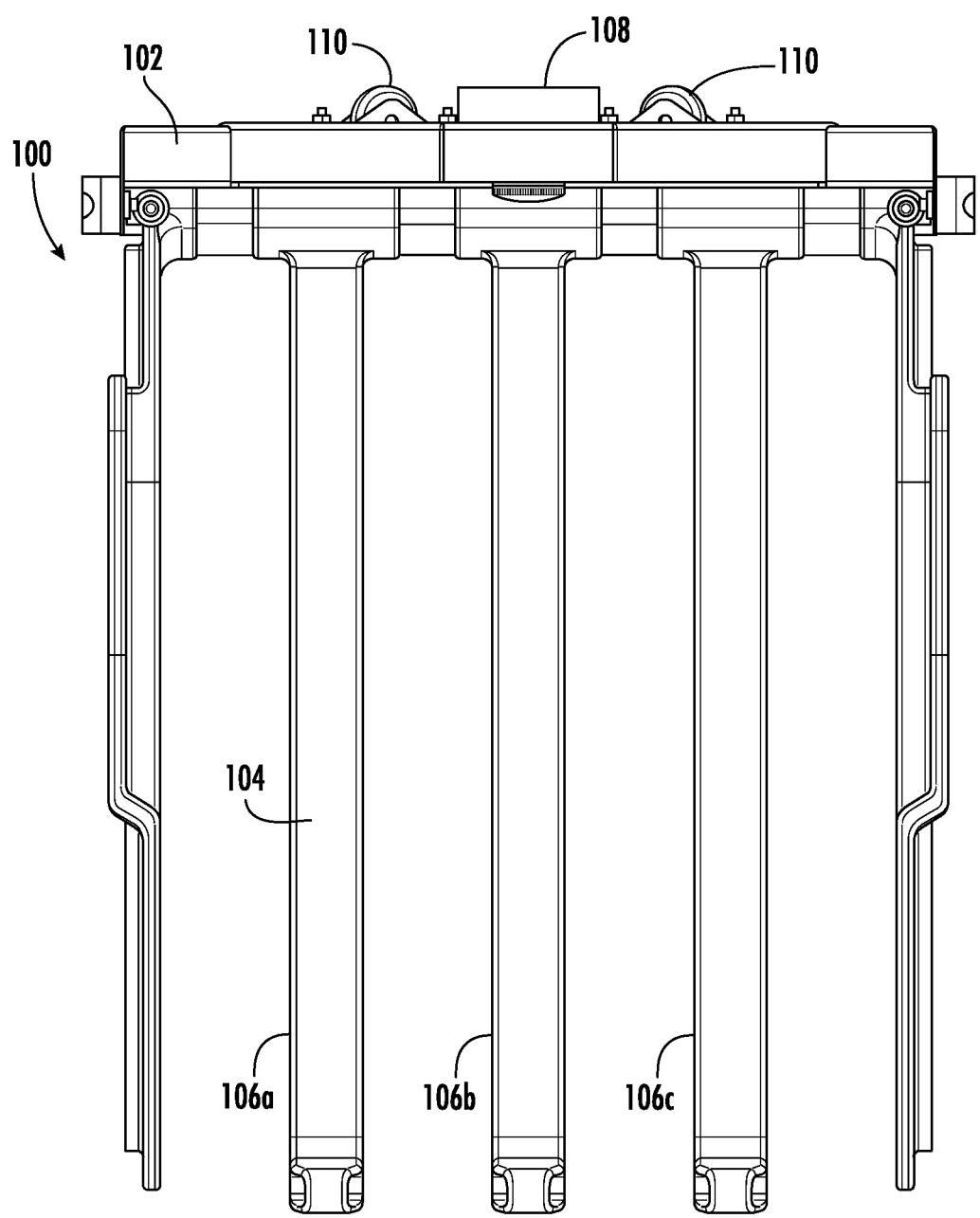
FIG. 18 is a top plan view of the carrier basket shown alone.
Figure 19:
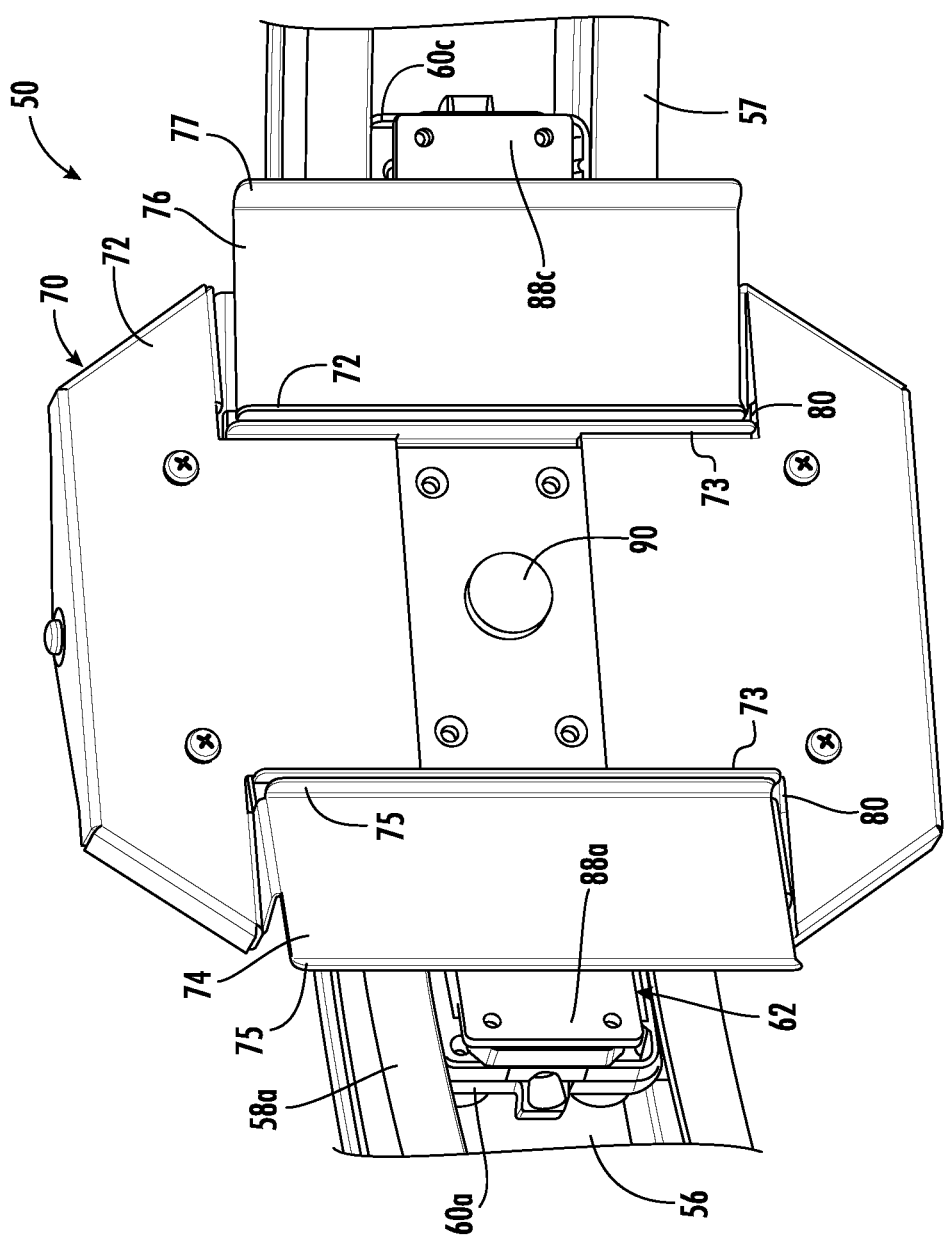
FIG. 19 is a perspective view showing the carrier basket support and stabilizing system in a portion of the track which defines the pathway of the conveyor system shown traversing an inside curve.
Figure 20:
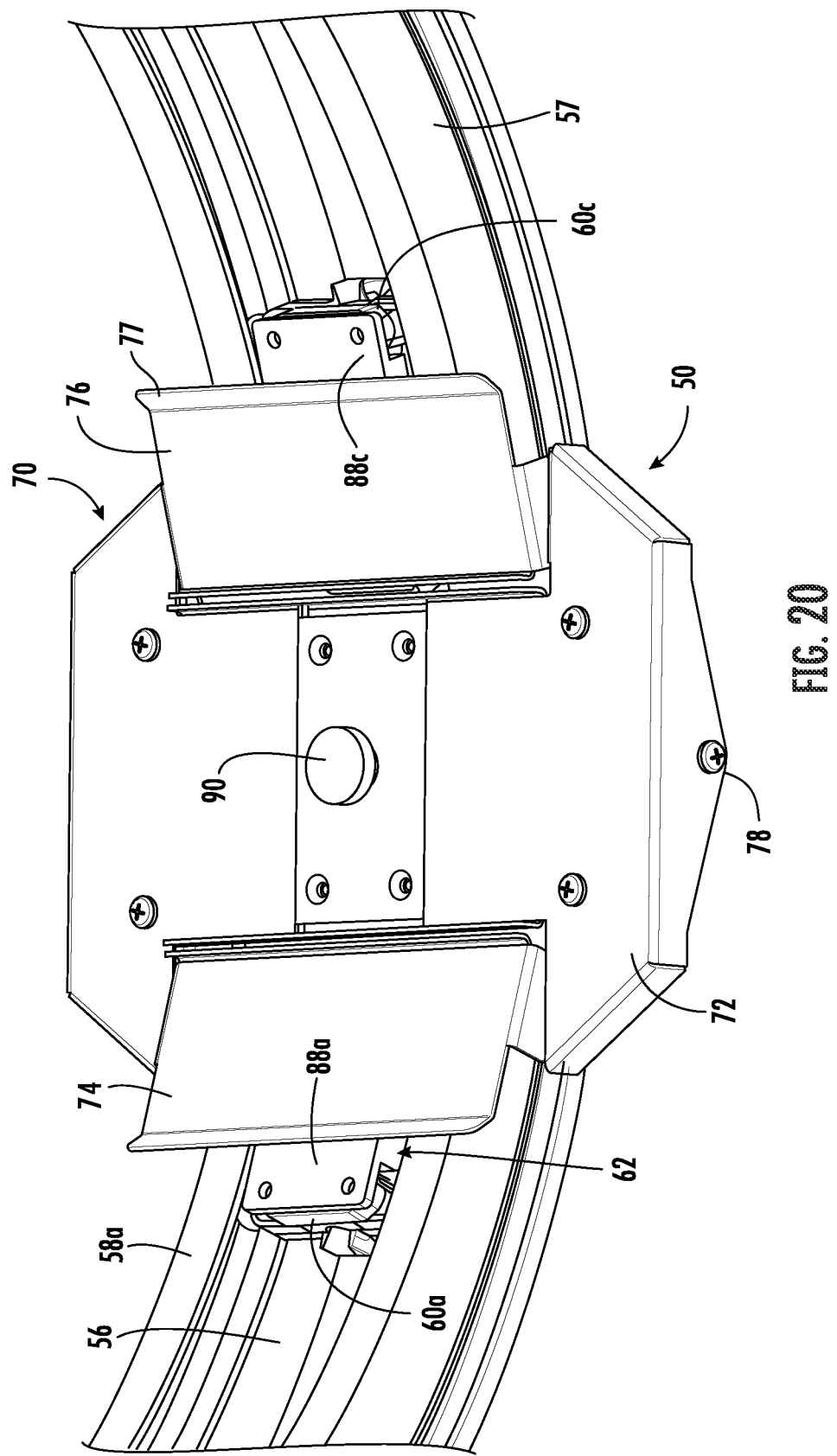
FIG. 20 is a perspective view similar to FIG. 19 looking upward at the carrier basket support.
Figure 21:
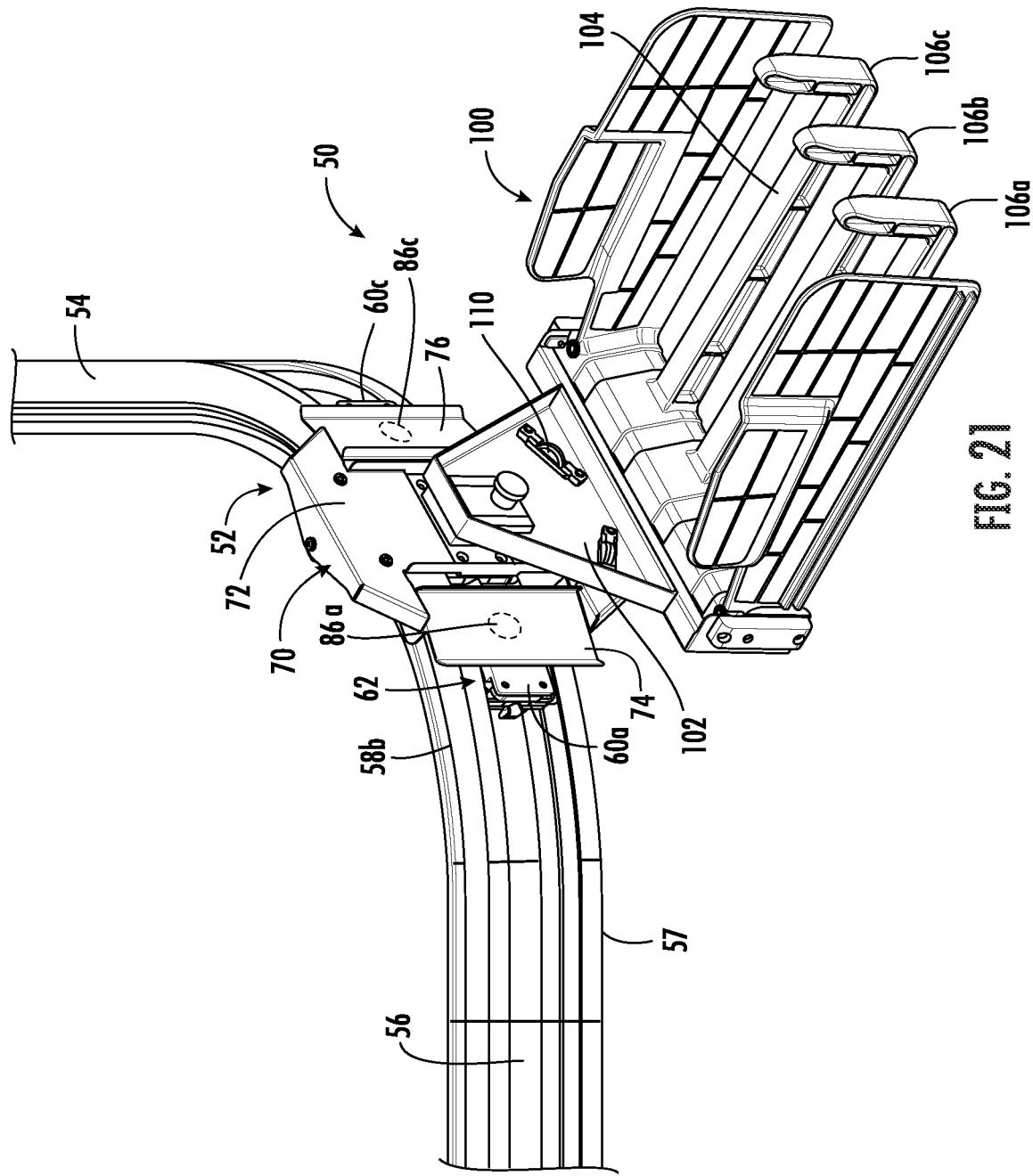
FIG. 21 is a perspective view showing the carrier basket support and stabilizing system traversing an outside corner along the pathway defined by the conveyor system.

Each of the carrier baskets 100 includes a back support 102 as well as a product support surface 104 that extends generally transversely from the back support 102 in a direction opposite to the pathway 56. The support surface 104 is preferably formed from a plurality of fingers 106*a*-106*c* in order to allow the carrier basket 100 to pass through loading and unloading stations 40, 42, such as discussed above in connection with FIG. 1, for loading and unloading of products to be transported. A pivot connection 108 is provided on the back support 102, preferably in the form of the key hole-type receptacle as shown in FIGS. 14 and 17, that allows the carrier basket 100 to be connected to the support post 90.

Figure 31:
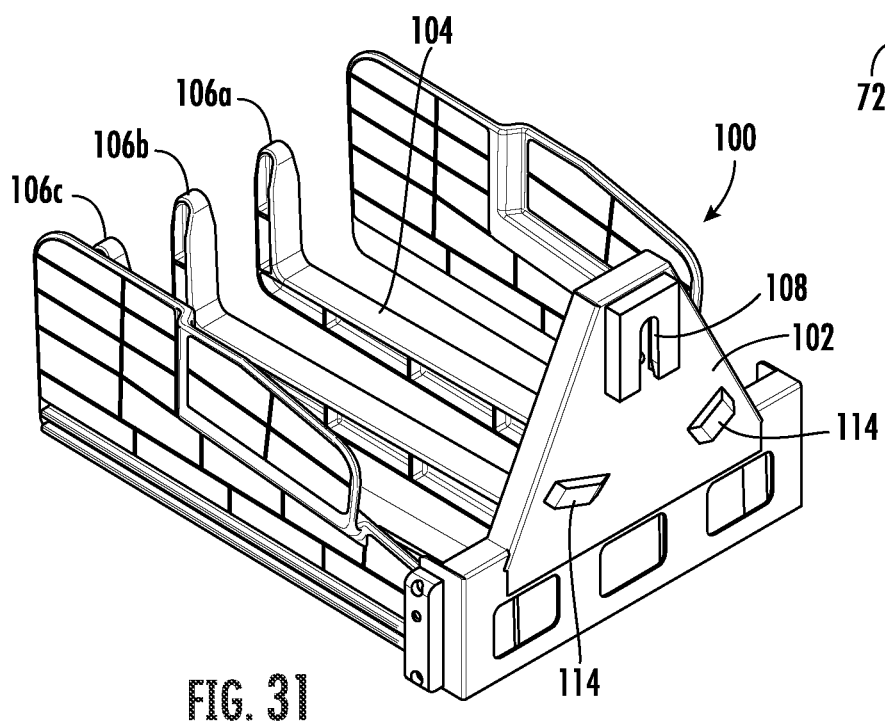
FIG. 31 is a rear perspective view of an alternate embodiment of the carrier basket similar to FIG. 14 showing low friction contact elements as slide blocks on the back support of the carrier basket.

As shown in FIGS. 2 and 9-18, low friction contact elements, preferably in the form of rollers 110, are connected to the back support 102 and are configured for low friction moving contact, preferably rolling contact, with at least one of the center plate 72, the first wing plate 74, or the second wing plate 76, (for example along a contact path 111 shown in FIG. 3 which extends over the flat parts of the center plate 72 and first and second wing plates 74, 76, avoiding the flanges 73, 75, 77, if present) depending on an orientation of the carrier basket support 70 as the carrier basket support 70 is moved by the support group 62 of cars 60 along the pathway 56. Alternatively, slide blocks 114, shown in FIG. 31, preferably made of a polymeric material, can be fastened to the back support 102 of the carrier basket 100 to provide a low friction sliding contact with at least one of the center plate 72, the first wing plate 74, or the second wing plate 76 which would follow a similar contact path 111, as discussed above. Through these arrangements, any cantilevered loads that are located on the product support surface 104 are transferred via the rollers 110 or slide blocks 114 to at least on of the center plate 72, the first wing plate 74 or the second wing plate 76, regardless of the specific orientation of the carrier basket support 70 along the pathway 56. This provides 360 degree support throughout various positions of the carrier basket support 70 as it traverses along the pathway 56 defined by the tracks 57. Several examples are shown in FIGS. 19-28. Further, based on the first and second wing plates 74, 76 being pivotally connected to the center plate 72, the carrier basket support 70 traversing inside and outside horizontal (X-Z plane) corners as shown in FIGS. 19-23 does not present a problem since the wing plates, 74, 76 can pivot along with the leading and trailing cars 60*a*, 60*c* relative to the center car 60*b* while still being held in position via the first and second magnets 86*a*, 86*b* attracting and holding the first and second wing plates 74, 76 there against as they are formed of or include a ferromagnetic material, preferably on the pathway side thereof. Alternatively, the springs 87*a*, 87*b* bias the first and second wing plates 74, 76 against the respective leading and trailing cars 60*a*, 60*c*.

In order to reduce friction during any such sliding movement, as shown in detail in FIG. 8, preferably a first sliding contact plate 88*a* is located on the lead car 60*a* and a second sliding contact plate 88*c* is located on the trailing car 60*c*. The first and second wing plates 74, 76 are then in sliding contact with the respective first and second sliding contact plates 88*a*, 88*c* in order to reduce friction. The first and second sliding contact plates 88*a*, 88*c* are preferably made of a self-lubricating or polymeric material, and can be for example, formed of a polyamide such as Nylon.

Preferably when the first and second magnets 86*a*, 86*c* are used, they are recessed beneath the respective sliding contact surfaces 89*a*, 89*c* of the respective first and second sliding contact plates 88*a*, 88*c*.

As shown in FIGS. 19-23, the pathway 56 may include horizontal curved portions, including inward and outward curves 58*a*, 58*b*, and the lead and trailing cars 60*a*, 60*c* of a car group 62 are configured to pivot relative to the center car 60*b* of the support group 62 as the cars 60 travel around these curved portions 58*a*, 58*b*. Based on the pivotal mounting of the first and second wing plates 74, 76 to the center plate 72, the wing plates 74, 76 pivot relative to the center plate 72 while preferably being maintained in contact with the lead and trailing cars 60*a*, 60*c* by the respective first and second magnets 86*a*, 86*c* attracting the ferromagnetic material or via the springs 87*a*, 87*b* biasing the wing plates 74, 76 there-against.

For traversing along vertical curved portions of the pathway 56, as shown in FIGS. 24-28, the first and second wing plates 74, 76 can slide along the face of the respective leading and trailing cars 60*a*, 60*c*, preferably on the respective first and second sliding contact plates 88*a*, 88*b* as the cars 60*a*, 60*b*, 60*v* pivot relative to one another along the pathway 56, remaining generally co-planar with the center plate 72 in order to provide 360 degree support as the carrier basket 100 pivots on the support post 90, with the rollers 110 or slide blocks 114 being in contact with the carrier basket support 70.

Referring again to FIGS. 13-18, the rollers 110 are preferably rotatably mounted in openings 112 in the back support 102 of the carrier basket 100 in a position below the pivot connection 108. This ensures that any cantilevered loads on the product support surface 104 are transferred via the rollers 110 into at least one of the center plate 72, the first winged plate 74, or the second winged plate 76. Based on the pivot connection 108, the carrier basket can rotate 360 degrees through various positions while still being fully supported with the rollers 110 being in contact with the carrier basket support as shown in FIGS. 24-28.

Figure 22:
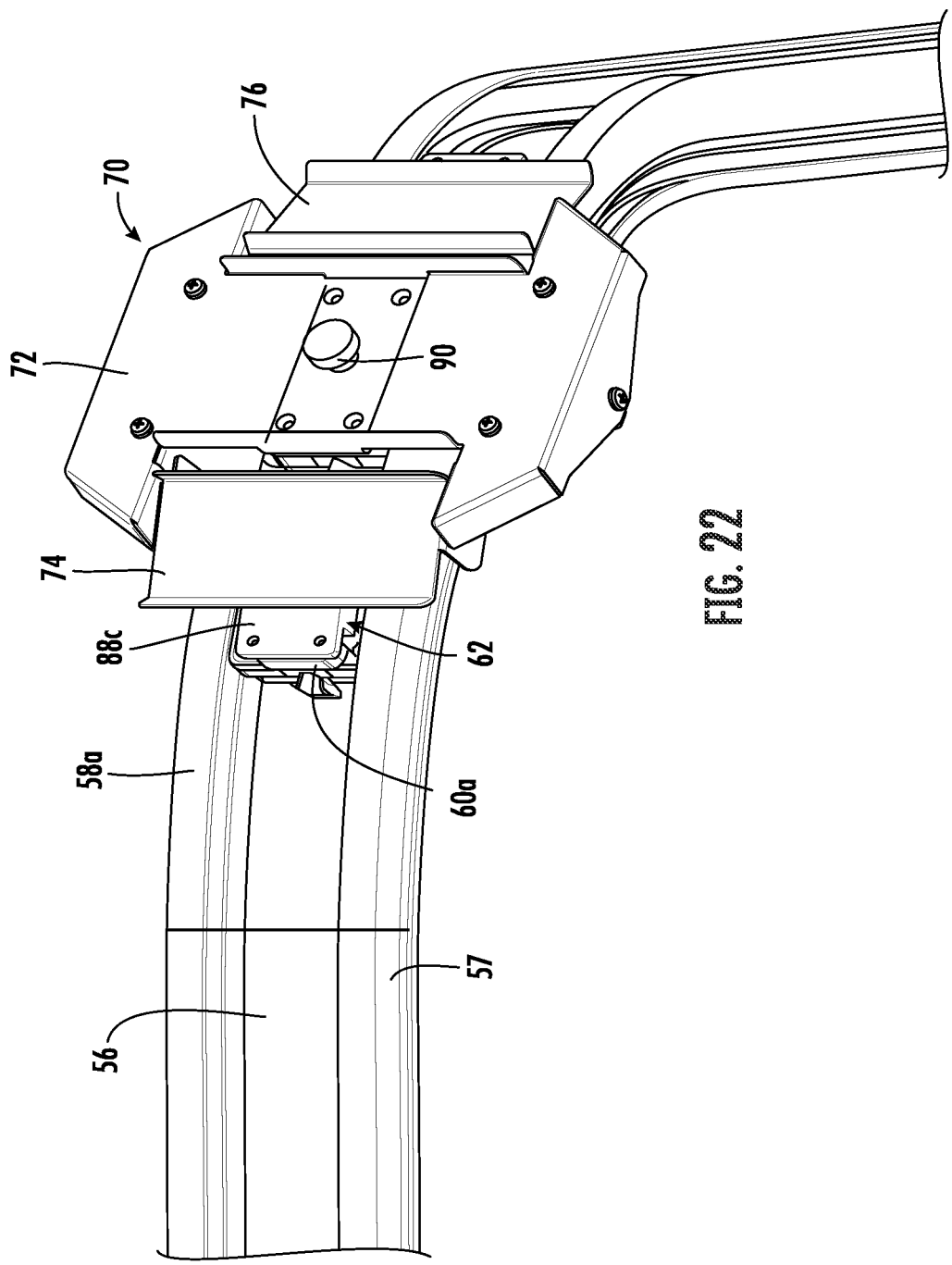
FIG. 22 is a perspective view similar to FIG. 21 showing the carrier basket support traversing the outside curve along the pathway defined by the conveyor system.
Figure 23:
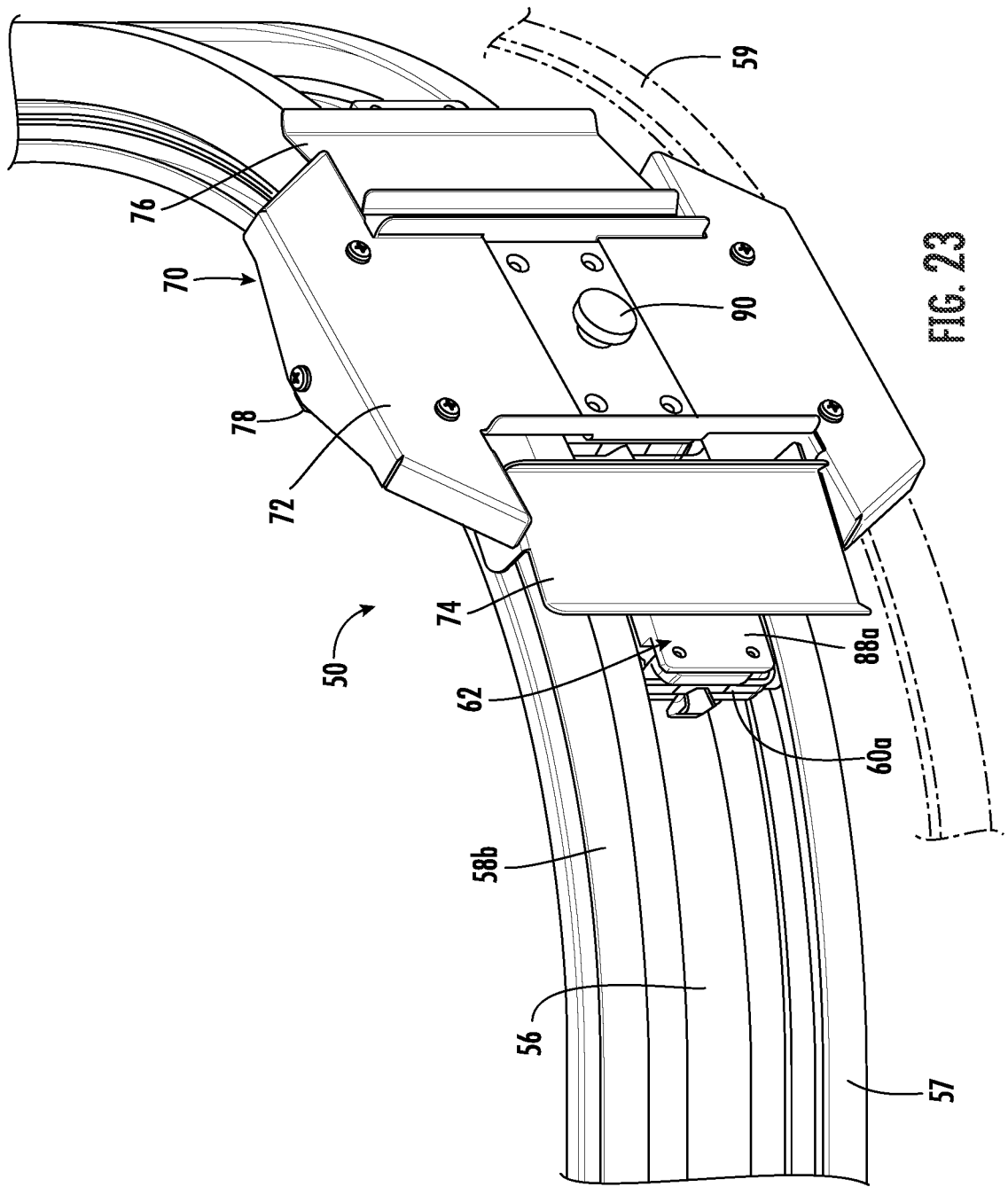
FIG. 23 is a perspective view similar to FIG. 22 shown from a different orientation.
Figure 24:
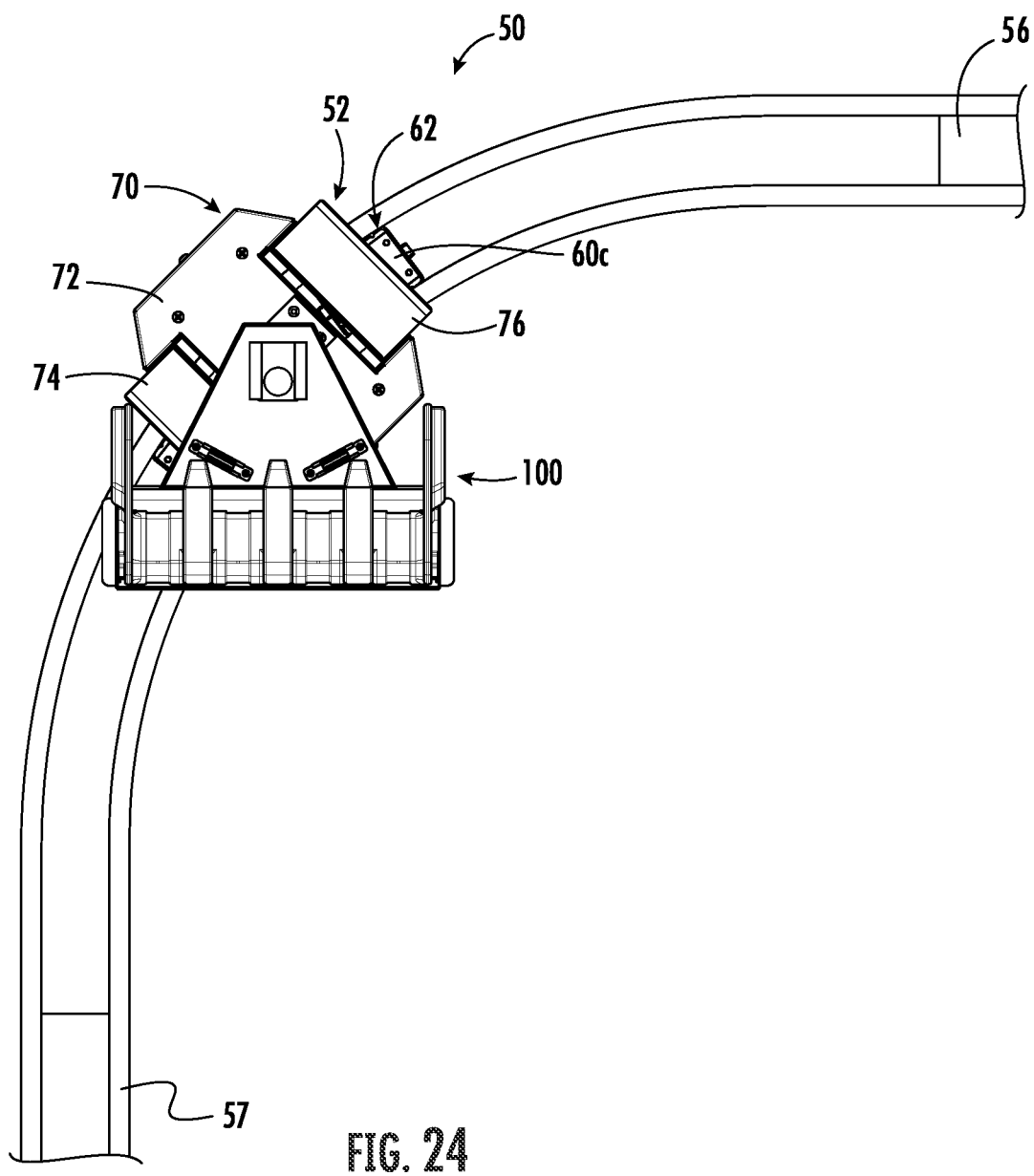
FIG. 24 is an elevational view showing the carrier basket support and stabilizing system traversing a portion of the pathway with a vertical to horizontal bend.
Figure 25:
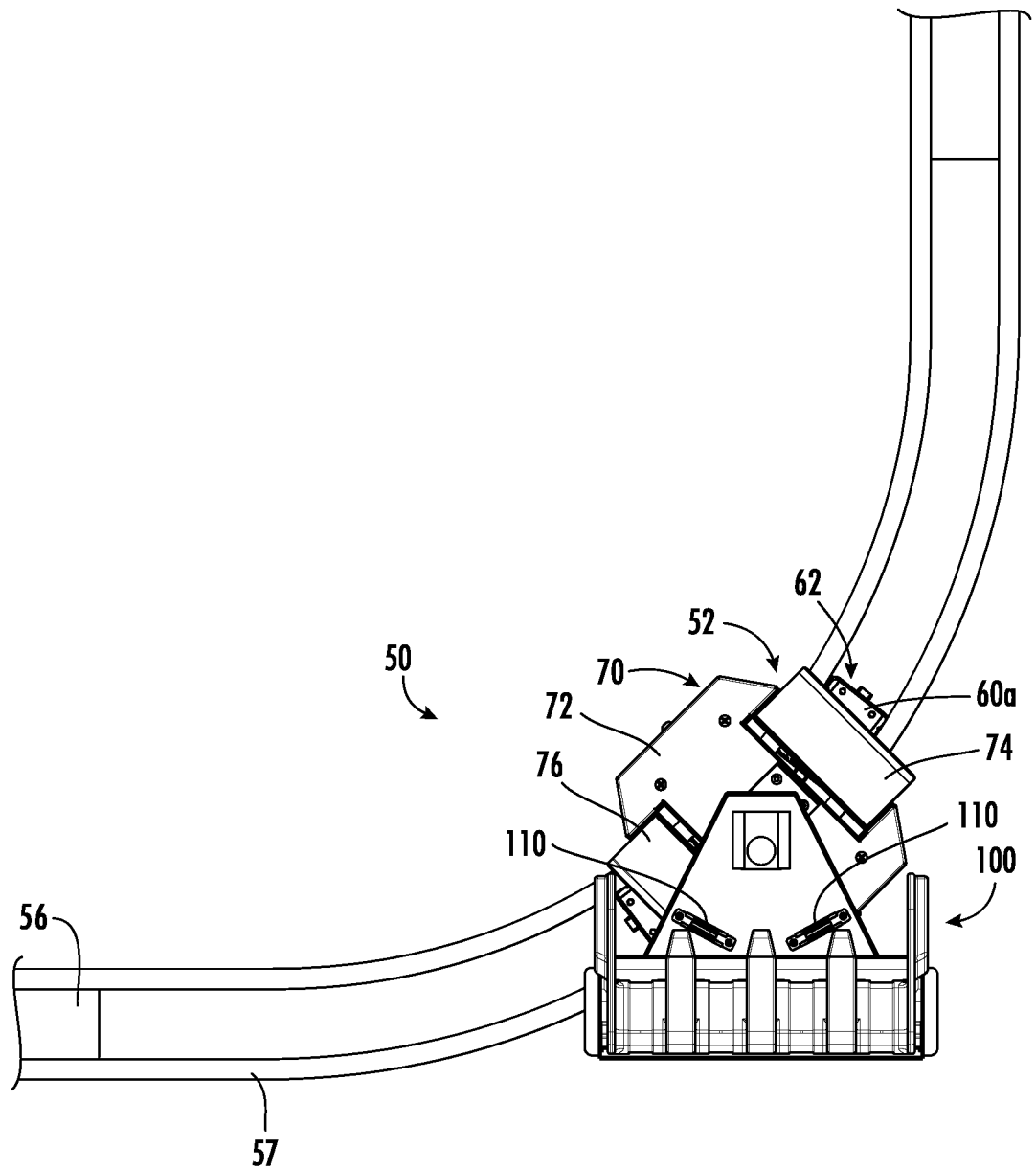
FIG. 25 is an elevational view showing the carrier basket support and stabilizing system traversing a different vertical to horizontal bend along the pathway of the conveyor system.
Figure 26:
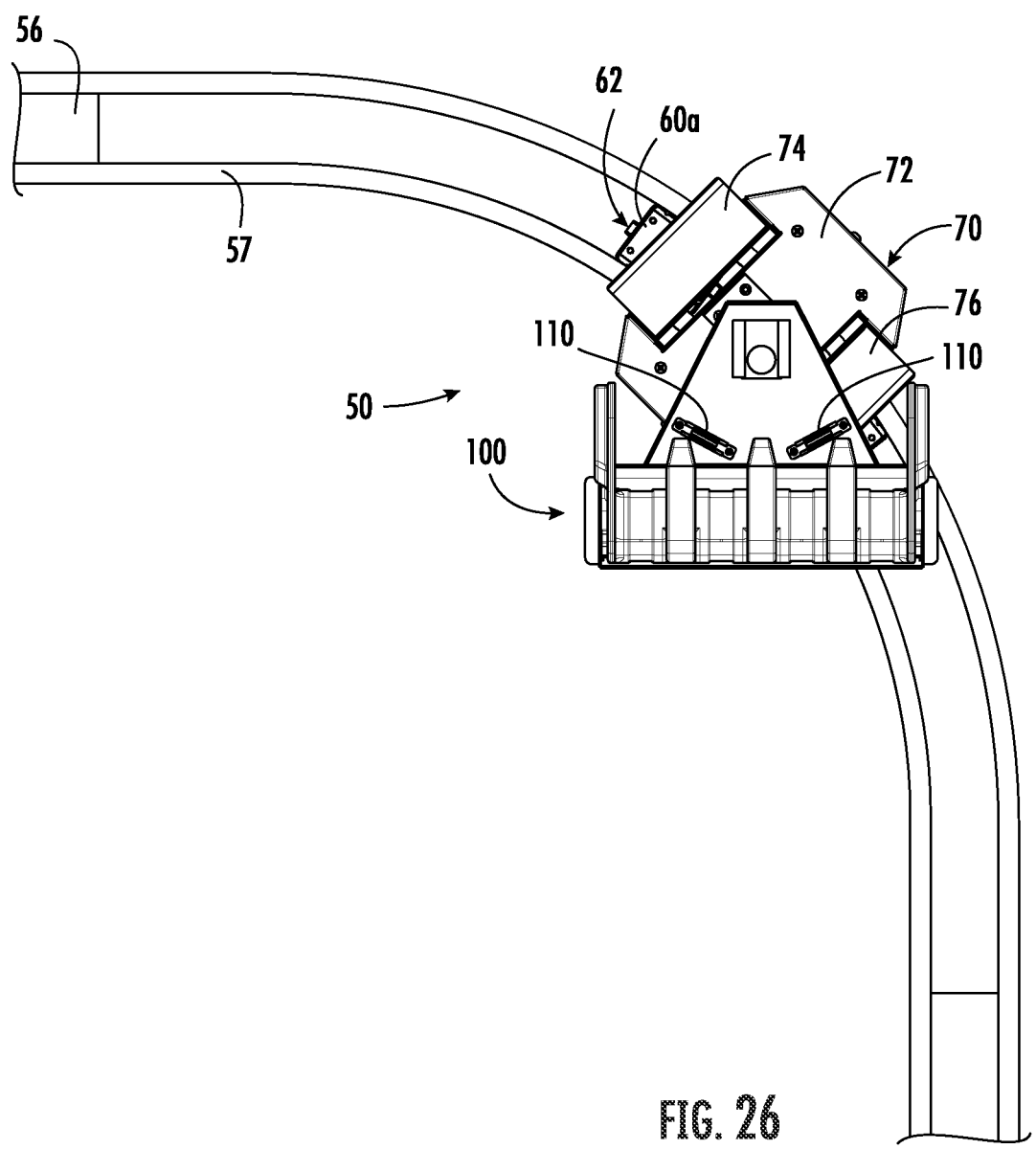
FIG. 26 is a further elevational view showing the carrier basket support and stabilizing system traversing a further vertical to horizontal bend along the pathway defined by the conveyor system.
Figure 27:
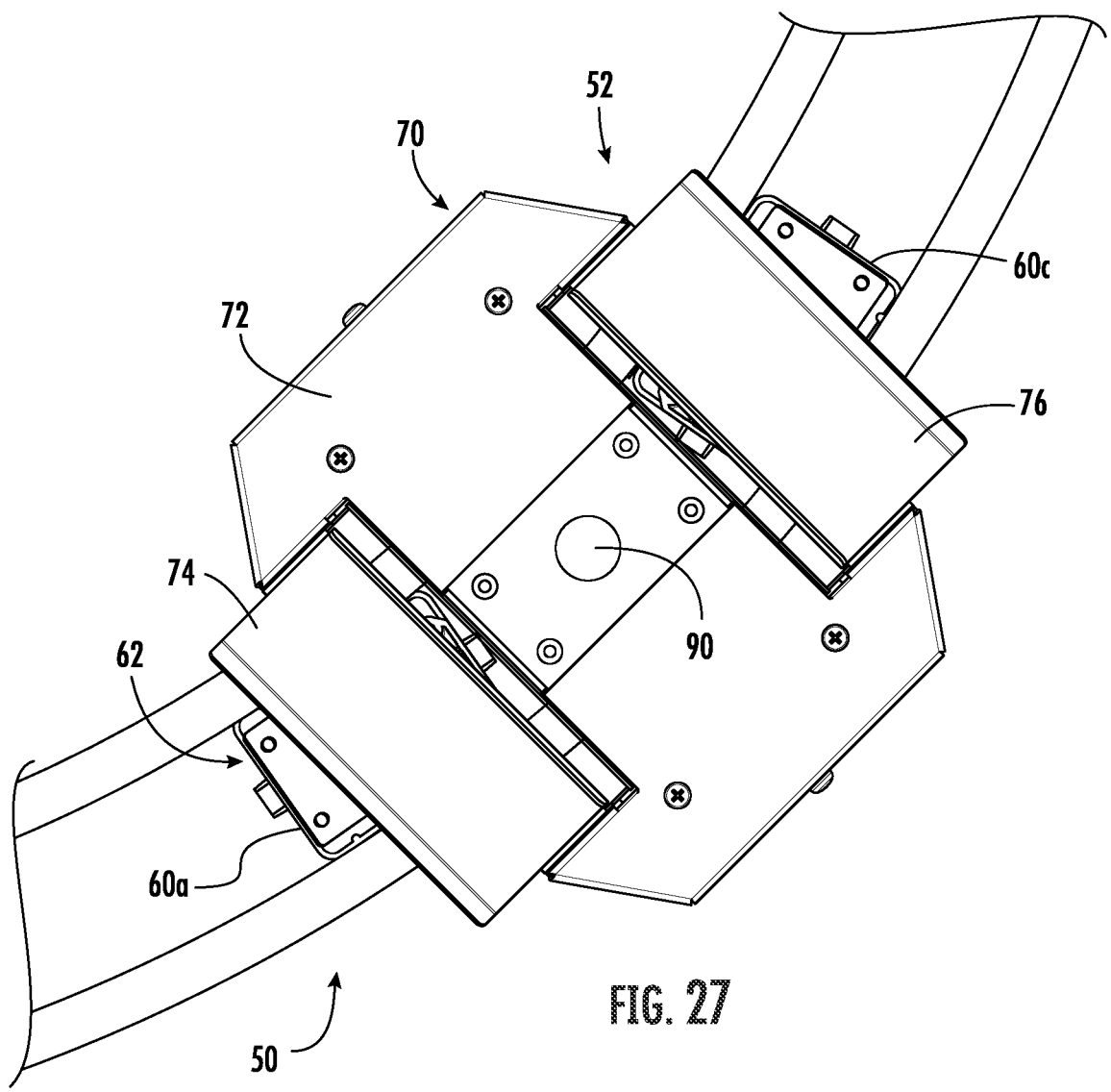
FIG. 27 is an enlarged view showing the carrier basket support traveling along a horizontal to vertical bend in the pathway defined by the conveyor system.
Figure 28:
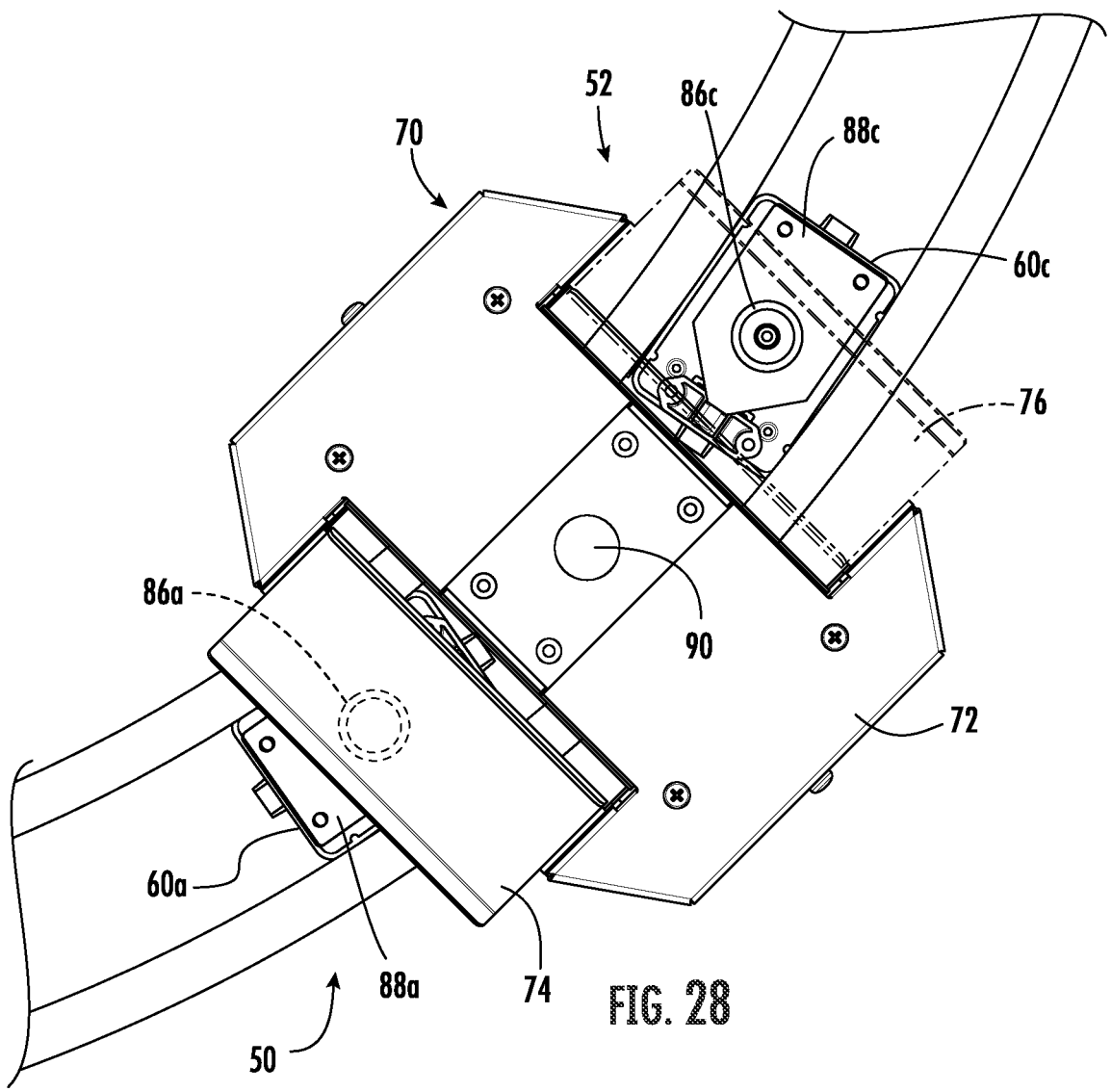
FIG. 28 is a view similar to FIG. 27 in which one of the two wing plates is shown in phantom lines for the carrier basket support traversing along a vertical to horizontal bend in the pathway defined by the conveyor system.

Referring now to FIG. 22 as well as FIGS. 4-6, the carrier basket support 70 may further include support rollers 78 affixed to opposite sides of the center plates 72 that are aligned for rolling in a direction of the pathway 56. These support rollers 78 may contact a separate support rail 59, shown only in broken lines in FIG. 22, to provide additional support along some or all of the pathway 56. Slide blocks could alternatively be used in place of the support rollers.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the ap-pended claims rather than by the foregoing description, and all alternate embodiments and changes to this embodiment which come within the meaning and range of equivalency of said claims are therefore to be embraced therein.

The invention claimed is:

1. A carrier basket support and stabilizing system for a carrier basket transporter including a conveyor system having a pathway, the system comprising:
    a plurality of cars configured to travel along the pathway, at least some support groups including three of the cars, each said support group of three of the cars including a lead car, a center car, and a trailing car that are connected in series via pivoting connections, and a carrier basket support connected to the center car;
    the carrier basket support including:
        a center plate fixedly connected to the center car;
        first and second wing plates located on opposite sides of and pivotally connected to the center plate; and
        a support post on the center car configured for connection to a carrier basket on a side facing away from the pathway;
    and
    the carrier basket including:
        a back support;
        a product support surface extending generally transversely from the back support in a direction opposite to the pathway;
        a pivot connection on the back support that is connected to the support post; and
        low friction contact elements connected to the back support that are configured for low friction moving contact with at least one of the center plate, the first wing plate, or the second wing plate depending on an orientation of the carrier basket support as the carrier basket support is moved by the support group of cars along the pathway.

2. The system of claim 1, wherein the first and second wing plates are formed of or include a ferromagnetic material, and the lead car includes a first magnet for slidably retaining the first wing plate there-against as the lead car pivots relative to the center car as the cars move along the pathway, and the trailing car includes a second magnet for slidably retaining the second wing plate there-against as the trailing car pivots relative to the center car as the cars move along the pathway.

3. The system of claim 2, further comprising a first sliding contact plate located on the lead car and a second sliding contact plate located on the trailing car, and the first and second wing plates being in sliding contact with the respective first and second sliding contact plates.

4. The system of claim 3, wherein the first and second magnets are recessed beneath respective sliding contact surfaces of the respective first and second sliding contact plates.

5. The system of claim 2, wherein the pathway includes horizontal curved portions, and the lead and trailing cars are configured to pivot relative to the center car as the support group of cars travels around the curved portions, and the first and second wing plates are configured to pivot relative to the center plate while being maintained in contact with the lead and trailing cars by the respective first and second magnets.

6. The system of claim 1, wherein the low friction contact elements comprise rollers configured for rolling movement on at least one of the center plate, the first wing plate, or the second wing plate depending on the orientation of the carrier basket support as the carrier basket support is moved by the support group of cars along the pathway.

7. The system of claim 5, wherein the rollers are rotatably mounted in openings in the back support in a position below the pivot connection.

8. The system of claim 1, wherein the product support surface comprises a plurality of spaced apart fingers.

9. The system of claim 1, wherein the cars include track rollers that are configured to ride on a track that defines the pathway.

10. The system of claim 1, wherein each said car is connected to an adjacent one of said cars by a ball and socket connection.

11. The system of claim 1, further comprising support rollers affixed to opposite sides of the center plate that are aligned for rolling in a direction of the pathway.

12. The system of claim 1, wherein the first and second wing plates are each connected to the center plate by two pivot bearings.

13. The system of claim 1, further comprising springs that bias the first and second wing plates respectively toward the leading and trailing cars.

14. The system of claim 13, further comprising a first sliding contact plate located on the lead car and a second sliding contact plate located on the trailing car, and the first and second wing plates being in sliding contact with the respective first and second sliding contact plates.

* * * * *